US011068200B2

(12) United States Patent
Niu et al.

(10) Patent No.: US 11,068,200 B2
(45) Date of Patent: Jul. 20, 2021

(54) METHOD AND SYSTEM FOR MEMORY CONTROL

(71) Applicant: Alibaba Group Holding Limited, Grand Cayman (KY)

(72) Inventors: Dimin Niu, Sunnyvale, CA (US); Lide Duan, Sunnyvale, CA (US); Yuhao Wang, Sunnyvale, CA (US); Xiaoxin Fan, Sunnyvale, CA (US); Zhibin Xiao, Sunnyvale, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/698,772

(22) Filed: Nov. 27, 2019

(65) Prior Publication Data

US 2021/0157516 A1 May 27, 2021

(51) Int. Cl.
*G06F 12/00* (2006.01)
*G06F 3/06* (2006.01)
*G06F 12/02* (2006.01)

(52) U.S. Cl.
CPC .......... *G06F 3/0658* (2013.01); *G06F 3/0614* (2013.01); *G06F 3/0683* (2013.01); *G06F 12/0238* (2013.01)

(58) Field of Classification Search
CPC .... G06F 3/0658; G06F 3/0614; G06F 3/0683; G06F 3/0659; G06F 3/0604; G06F 3/0673; G06F 12/0238; G06F 12/0246; G06F 9/3004
See application file for complete search history.

(56) References Cited

U.S. PATENT DOCUMENTS

| 5,844,858 | A | 12/1998 | Kyung |
| 2005/0083753 | A1* | 4/2005 | Ryan ........................ G11C 8/12 365/222 |
| 2006/0267172 | A1 | 11/2006 | Nguyen et al. |
| 2015/0143040 | A1 | 5/2015 | Resnick |
| 2017/0132150 | A1 | 5/2017 | Hampel et al. |
| 2018/0107406 | A1* | 4/2018 | O ........................... G06F 3/0683 |

OTHER PUBLICATIONS

PCT Search Report and Written Opinion dated Feb. 17, 2021 for PCT Application No. PCT/US20/60782, 11 pages.

* cited by examiner

*Primary Examiner* — Shawn X Gu
(74) *Attorney, Agent, or Firm* — Lee & Hayes, P.C.

(57) ABSTRACT

Methods and systems are provided for improving memory control. A memory architecture includes a plurality of memory units and an interface. A respective memory unit of the plurality of memory units is configured with a Processing-In-Memory (PIM) architecture. The interface includes a plurality of lines. The interface is coupled between the plurality of memory units and a host. The interface is configured to receive one or more signals from a host via the plurality of lines. The respective memory unit of the plurality of memory units is coupled with a respective line of the plurality of lines, and the respective memory unit is further configured to receive a respective signal of the one or more signals via the interface so as to be individually selected by the host.

47 Claims, 15 Drawing Sheets

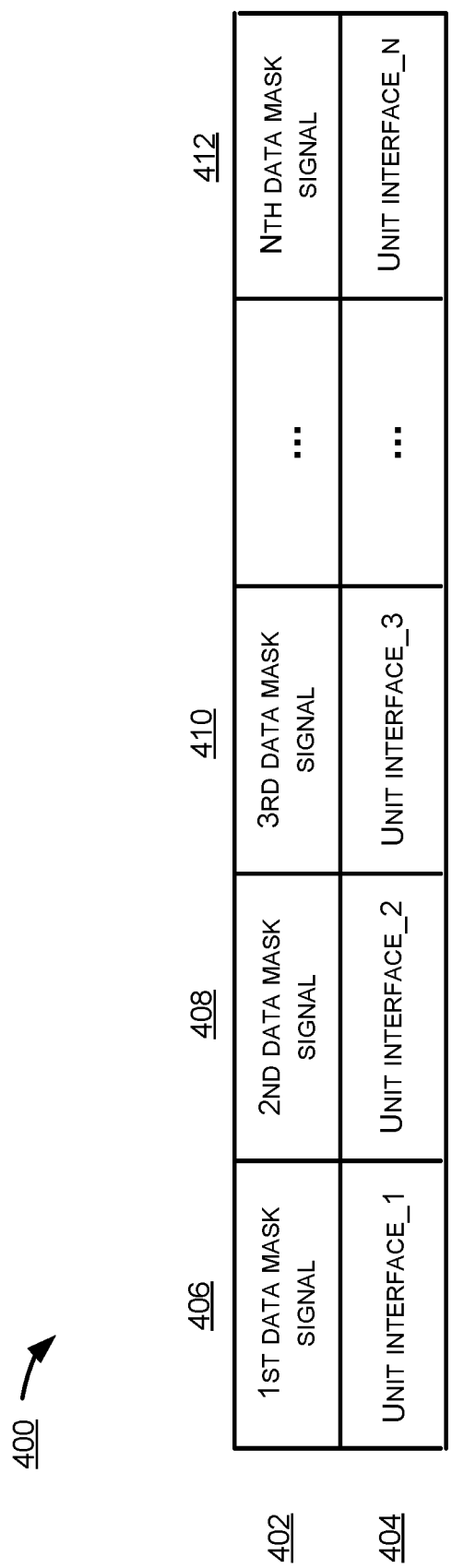

| | 618 Option 1 | 620 Option 2 | 622 Option 3 |
|---|---|---|---|
| 602 # of units per memory system | N <= # of ranks | N <= # of data mask signals | N <= value of the data width of the data bus |
| 604 Maximum system bandwidth | X GB/s | X GB/s | X GB/s |
| 606 Maximum unit BW | X GB/s | X/N GB/s | X/N GB/s |
| 608 Manner of controlling single unit | Rank select signals (unit select + row address) | Data mask signals | Unit I/O enable signals and unit I/O enable registers |
| 610 PCB routing/signal integrity | Difficult | Easy | Easy |
| 612 Extra overhead | No | No | Yes |
| 614 Considerations | Routability | Write only granularity of DM signal | Extra overhead |
| 616 Application | The unit requires high peak bandwidth | Change selection frequently | One or more units can be idle for a period |

```
INDIVIDUALLY SELECT ONE OR MORE MEMORY UNITS OF
A PLURALITY OF MEMORY UNITS OF A MEMORY SYSTEM
BY SENDING ONE OR MORE SIGNALS TO THE MEMORY
SYSTEM
1002
```

```
ACCESS THE ONE OR MORE MEMORY UNIT
1004
```

METHOD AND SYSTEM FOR MEMORY CONTROL

BACKGROUND

In the area of memory technology, designers and producers are aimed at improving memory architecture in terms of speed, capacity, cost, power efficiency, control efficiency, etc. Interfaces of memory are developed and upgraded to facilitate the improvement of memory architectures. For example, Peripheral Component Interconnect Express (PCIe or PCI-e) is a high-speed serial computer expansion bus standard, which regulates the common motherboard interface for personal computers' graphics cards, hard drives, memory, network hardware connections, etc. For another example, Compute Express Link (CXL) is a new high-speed CPU-to-Device, and CPU-to-Memory interconnect designed to accelerate next-generation data computation performance. However, conventional dynamic random-access memory (DRAM) technology has limitations, such as manufacture process, cost control, and the like, which make high-performance interfaces difficult to be implemented in the DRAM architecture.

Double Data Rate (DDR)-based interface is feasible to be implemented in the DRAM architecture. Usually, a conventional DDR interface based memory module is designed with two or more ranks, and only one rank can be selected at a given time. Therefore, all chips within the same rank are always selected simultaneously and work in lockstep. However, DDR protocols do not support per-chip data access, and different chips within the same rank cannot be selected separately. Thus, there is a need to improve the control of the DDR interface-based memory such that the respective chips can be selected, controlled, and accessed (read/write) separately with accuracy and flexibility to adapt to various usage scenarios.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example table of corresponding relationships between data mask signals and unit interfaces.

FIG. 6 illustrates an example table of characteristics of example option 1, example option 2, and example option 3.

DETAILED DESCRIPTION

Figure 1A:
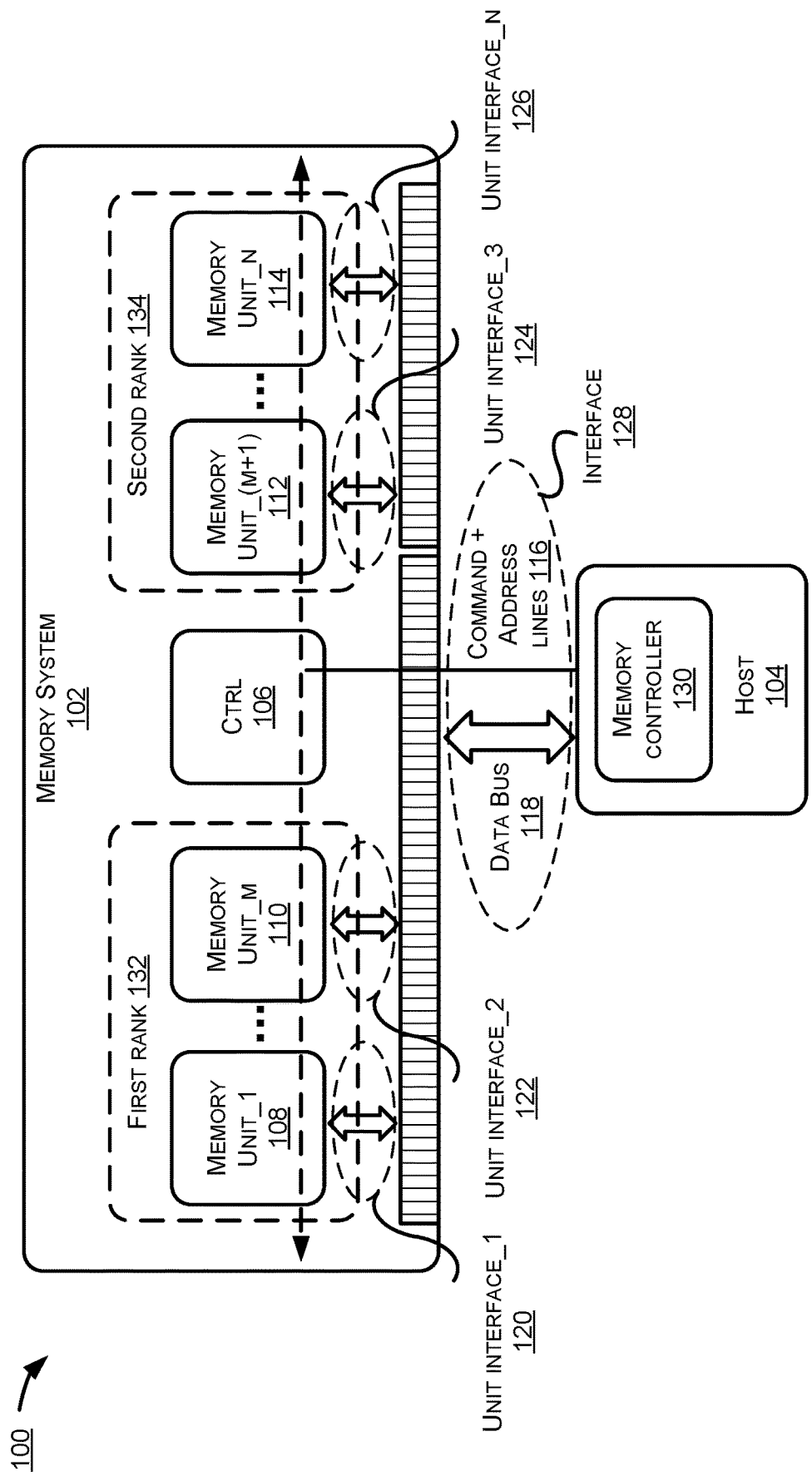
FIG. 1A illustrates an example schematic of communications between a memory system and a host.

Systems and methods discussed herein are directed to improving memory control, and more specifically to improving methods and systems for memory control.

Conventionally, the speed of memory has not kept up with the speed of CPU. The data movement from memory is more expensive in terms of bandwidth, energy, and latency than computation. The growing disparity between CPU and memory is referred to as the "memory wall."

Some researches aim to enable computation close to data storage areas to address the memory wall crisis. Processing-in-memory (PIM) architecture is rapidly rising as an attractive solution. With the PIM architecture, certain kinds of algorithms would be processed by data processing units (DPUs) inside the memory. Although researchers have studied the PIM concept for decades, the attempts to implement PIM architecture encountered difficulties due to practicality concerns. For example, the designer of PIM architecture cannot achieve the same high memory capacity on a single chip as on multiple chips. With traditional memory architecture, the memory chip-to-memory chip communications can become the bottleneck. Also, PIM may have an inferior position in the memory market. For example, 128 MB memory modules with PIM architecture from different manufacturers may not be interchangeable, which could hurt interoperability and drive prices up.

The practicality problems are alleviated with advances in emerging memory technologies in recent years. For example, an approach is to have DPUs integrated inside the DRAM. The distances between the DPUs and the memory cells in the DRAM are short, and the energy to move data back and forth is small, and the latencies are significantly low, meaning that computations can be performed within the memory quickly, which also frees up the CPU to do other kinds of complicated work. In other words, the PIM architecture can accelerate computation and reduce the overhead of data movement.

Emerging data-intensive workloads/applications can no longer be practically handled by traditional computers, which often subject to the Von Neumann bottleneck. The idea of Von Neumann bottleneck is that the computer system throughput is limited due to the relative ability of processors compared to top rates of data transfer. A processor is idle for a certain amount of time while memory is accessed. However, the new generation of data-intensive workloads/applications such as machine-learning tasks can benefit from the PIM technology. PIM acceleration solution localizes processing cores next to the data, solving the bottleneck of Big Data computing. Reportedly, PIM solutions can accelerate data-intensive workloads/applications 20 times, with almost zero extra energy surcharge. The developing PIM solution opens new horizons for the Big Data era, in terms of performance and cost-efficiency.

However, it is still challenging to integrate PIM architecture with conventional computing systems in a seamless manner because PIM architecture requires unconventional control techniques. Many of the current approaches do not address how to implement various control of PIM adequately.

FIG. 1A illustrates an example schematic 100 of communications between a memory system 102 and a host 104. In implementations, the memory system 102 may be any suitable type of memory architectures such as a DDR based memory architecture and the like. In implementations, the host may include, but is not limited to, a Central Processing Unit (CPU), an Application-Specific Integrated Circuit (ASIC), a Graphics Processing Unit (GPU), Field Programmable Gate Arrays (FPGAs), a Digital Signal Processor (DSP), or any combination thereof.

Referring to FIG. 1A, the memory system 102 may include a controller 106, and n memory units including memory unit_1 108, ..., memory unit_m 110, memory unit (m+1) 112, ..., and memory unit_n 114, where m and n are positive integers. By way of example but not limitation, the total number n of memory units in the memory system 102 is a power of 2.

The controller 106 is configured to receive command and address signals from the host 104. The controller 106 is further configured to control a respective memory unit of memory unit_1 108, ..., memory unit_m 110, memory unit (m+1) 112, ..., and memory unit_n 114. The controller 106 is further configured to receive command and address signals via command+address lines 116 from the host 104.

The respective memory unit of memory unit_1 108, ..., memory unit_m 110, memory unit (m+1) 112, ..., and memory unit_n 114 is configured to transfer data/signals via the data bus 118 to/from the host 104. In implementations, the data bus 118 may include individual bidirectional datapaths/channels for the respective memory unit to communicate with the host 104 to transfer data/signals, and the datapaths/channels are referred to as unit interface_1 120, unit interface_2 122, unit interface_3 124, ..., and unit interface_n 126. In implementations, the unit interface_1 120 is configured to transfer data/signals between the memory unit_1 108 and the host 104. The unit interface_2 122 is configured to transfer data/signals between the memory unit_m 110 and the host 104. The unit interface_3 124 is configured to transfer data/signals between the memory unit (m+1) 112 and the host 104. The unit interface_n 126 is configured to transfer data/signals between the memory unit_n 114 and the host 104. In implementations, the respective memory unit of memory unit_1 108, ..., memory unit_m 110, memory unit (m+1) 112, ..., and memory unit_n 114 may be a "×4" ("by four"), "×8" ("by eight"), "×16" ("by sixteen"), etc. memory chip/unit, where "×4", "×8", and "×16" refer to the data width of the chip/unit in bits. As an example, memory unit_1 108, ..., memory unit_m 110, memory unit (m+1) 112, ..., and memory unit_n 114 are configured to transfer data/signals at a data width of 16 bits.

In implementations, the respective memory unit of memory unit_1 108, ..., memory unit_m 110, memory unit (m+1) 112, ..., and memory unit_n 114 may be configured with an accelerator architecture. In implementations, the accelerator architecture is designed to provide powerful computing capability and large memory capacity/bandwidth. An example accelerator architecture may be the DRAM technology-based PIM architecture, which incorporates the memory and computation resource in the same memory chip/unit. A number of computation operations can be done while the data stays in the DRAM. This saves time, power, and effective memory bandwidth. More examples of accelerator architectures may include, but not limited to, Intelligent Random Access Memory (IRAM) architecture, DRAM-based Reconfigurable In-Situ Accelerator (DRISA) architecture, etc.

Collectively, the command+address lines 116 and the data bus 118 may be referred to as interface 128. In other words, the interface 128 may include the command+address lines 116 and the data bus 118. The interface 128 is coupled between the host 104 and the memory system 102/the respective memory units. In implementations, the interface 128 may be any suitable memory interfaces, for example, a DDR interface. In implementations, the interface 128 may further include other lines such as clock lines, response signal lines, control signal lines, and the like.

The host 104 may include a memory controller 130. The host 104 is configured to exchange data/signal with the memory system 102 using the memory controller 130 via the data bus 118. In implementations, the data width of the data bus 118 may be any suitable width, for example, 64 bits and the like. By way of example but not limitation, the data width of the data bus 118 is a power of two. The host 104 is further configured to send command and address signals to the controller 106 of the memory system 102 using the memory controller 130 via command+address lines 116.

Under the DDR protocol, a DDR based memory module is designed with two or more ranks. A rank is a set of memory chips/units connected to the same rank select signal, and only one rank can be selected at a given time. Taking the above example schematic 100 as an example, the memory unit_1 108, ..., and the memory unit_m 110 may be in the first rank 132, the memory unit (m+1) 112, ..., and the memory unit_n 114 may be in the second rank 134. Though FIG. 1A shows two ranks in the memory system 102, the memory system 102 may include other numbers of ranks. Therefore, all memory chips/units within the same rank are always selected simultaneously and work in lockstep. For example, the memory unit_1 108, ..., and the memory unit_m 110 in the first rank 132 are always selected together. For example, the memory unit (m+1) 112, ..., and the memory unit_n 114 in the second rank 134 are always selected together. However, different chips/units within the same rank cannot be selected separately. For example, the memory unit_1 108, ..., and the memory unit_m 110 in the first rank 132 cannot be selected separately. For example, the memory unit (m+1) 112, ..., and the memory unit_n 114 in the second rank 134 cannot be selected separately.

Figure 1B:
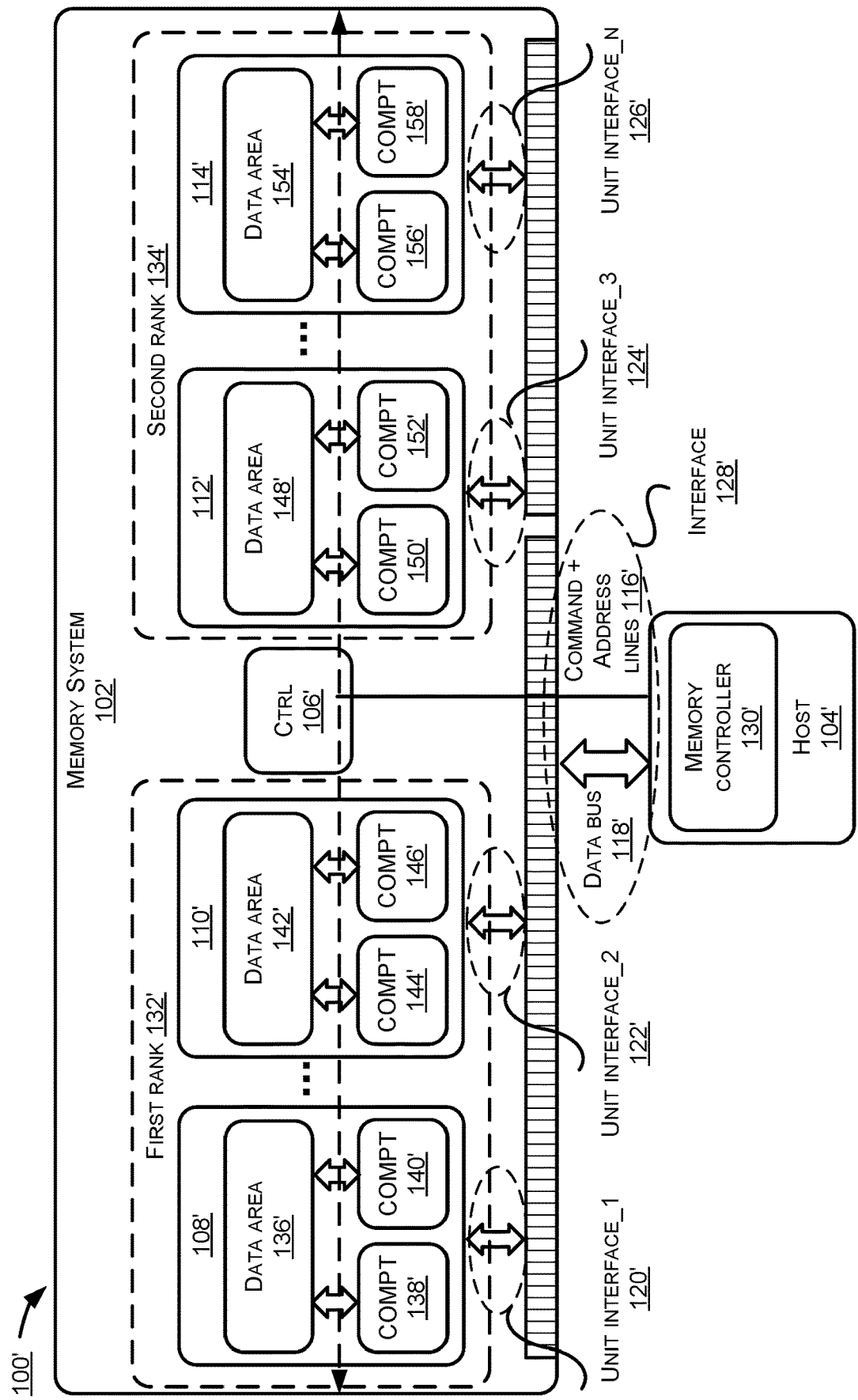
FIG. 1B illustrates an example schematic of communications between a memory system and a host.

FIG. 1B illustrates an example schematic 100' of communications between a memory system 102' and a host 104'. In implementations, the memory system 102' may be any suitable type of memory architectures such as a DDR based memory architecture and the like. In implementations, the host may include, but is not limited to, a CPU, an ASIC, a GPU, FPGAs, a DSP, or any combination thereof.

Referring to FIG. 1B, the memory system 102' may include a controller 106', and n memory units including memory unit_1 108', ..., memory unit_m 110', memory unit (m+1) 112', ..., and memory unit_n 114', where m and n are positive integers. By way of example but not limitation, the total number n of memory units in the memory system 102' is a power of 2.

The controller 106' is configured to receive command and address signals from the host 104'. The controller 106' is further configured to control a respective memory unit of memory unit_1 108', ..., memory unit_m 110', memory unit (m+1) 112', ..., and memory unit_n 114'. The controller 106' is further configured to receive command and address signals via command+address lines 116' from the host 104'.

The respective memory unit of memory unit_1 108', ..., memory unit_m 110', memory unit (m+1) 112', ..., and memory unit_n 114' is configured to transfer data/signals via the data bus 118' to/from the host 104'. In implementations, the data bus 118' may include individual bidirectional datapaths/channels for respective memory unit to communicate with the host 104 to transfer data/signals, and the datapaths/channels are referred to as unit interface_1 120', unit interface_2 122', unit interface_3 124', ..., and unit interface_n 126'. In implementations, the unit interface_1 120' is configured to transfer data/signals between the memory unit_1 108' and the host 104'. The unit interface_2 122' is configured to transfer data/signals between the memory unit_m 110' and the host 104'. The unit interface_3 124' is configured to transfer data/signals between the memory unit (m+1) 112' and the host 104'. The unit interface_n 126' is configured to transfer data/signals between the memory unit_n 114' and the host 104'. In implementations, the respective memory unit of memory unit_1 108', ..., memory unit_m 110', memory unit (m+1) 112', ..., and memory unit_n 114' may be a "×4" ("by four"), "×8" ("by eight"), "×16" ("by sixteen"), etc. memory chip/unit, where "×4", "×8", and "×16" refer to the data width of the chip/unit in bits. As an example, memory unit_1 108', ..., memory unit_m 110', memory unit (m+1) 112', ..., and memory unit_n 114' are configured to transfer data/signals at a data width of 16 bits.

Collectively, the command+address lines 116' and the data bus 118' may be referred to as interface 128'. In other words, the interface 128' may include the command+address lines 116' and the data bus 118'. The interface 128' is coupled between the host 104' and the memory system 102'/the respective memory units. In implementations, the interface 128' may be any suitable memory interfaces, for example, a DDR interface. In implementations, the interface 128' may further include other lines such as clock lines, response signal lines, control signal lines, and the like.

The host 104' may include a memory controller 130'. The host 104' is configured to exchange data/signal with the memory system 102' using the memory controller 130' via the data bus 118'. In implementations, the data width of the data bus 118' may be any suitable width, for example, 64 bits and the like. The host 104' is further configured to send command and address signals to the controller 106' of the memory system 102' using the memory controller 130' via command+address lines 116.

Under the DDR protocol, a DDR based memory module is designed with two or more ranks. A rank is a set of memory chips/units connected to the same rank select signal, and only one rank can be selected at a given time. Taking the above example schematic 100' as an example, the memory unit_1 108', ..., and the memory unit_m 110' may be in the first rank 132', the memory unit (m+1) 112', ..., and the memory unit_n 114' may be in the second rank 134'. Though FIG. 1B shows two ranks in the memory system 102, the present disclosure is not limited thereto, and the memory system 102 may include other numbers of ranks. Therefore, all memory chips/units within the same rank are always selected simultaneously and work in lockstep. For example, the memory unit_1 108', ..., and the memory unit_m 110' in the first rank 132' are always selected together. For example, the memory unit (m+1) 112', ..., and the memory unit_n 114' in the second rank 134' are always selected together. However, different chips/units within the same rank cannot be selected separately. For example, the memory unit_1 108', ..., and the memory unit_m 110' in the first rank 132' cannot be selected separately. For example, the memory unit (m+1) 112', ..., and the memory unit_n 114' in the second rank 134' cannot be selected separately.

In implementations, the respective memory unit of memory unit_1 108', ..., memory unit_m 110', memory unit (m+1) 112', ..., and memory unit_n 114' may be configured with an accelerator architecture, for example, a PIM architecture. In implementations, memory unit_1 108' may include a data area 136' configured to store data, a computation block (COMPT in short) 138' configured to perform computation, and a computation block 140' configured to perform computation. The data area 136' is further configured to communicate/interact with the computation block 138' and the computation block 140'. Memory unit_m 110' may include a data area 142' configured to store data, a computation block 144' configured to perform computation, and a computation block 146' configured to perform computation. The data area 142' is further configured to communicate/interact with the computation block 144' and the computation block 146'. Memory unit_(m+1) 112' may include a data area 148' configured to store data, a computation block 150' configured to perform computation, and a computation block 152' configured to perform computation. The data area 148' is further configured to communicate/interact with the computation block 150' and the computation block 152'. Memory unit_n 114' may include a data area 154' configured to store data, a computation block 156' configured to perform computation, and a computation block 158' configured to perform computation. The data area 154' is further configured to communicate/interact with the computation block 156' and the computation block 158'. Though FIG. 1B shows that the respective memory unit includes one data area and two computation blocks, the present disclosure is not limited thereto, and the respective memory unit may include other numbers of data areas and computation blocks. Additionally or alternatively, the computation blocks may include data processing units (DPUs). With the above PIM architecture, certain kinds of algorithms would be processed by the computation blocks/DPUs inside the memory unit, thereby eliminating some of the costly data movement and massively improving the overall efficiency of computation blocks.

As described above, there is a need to improve the memory control in terms of selecting and control the memory units individually with accuracy and flexibility even if the memory units are in the same rank of the memory system. More details are described hereinafter.

Figure 2A:
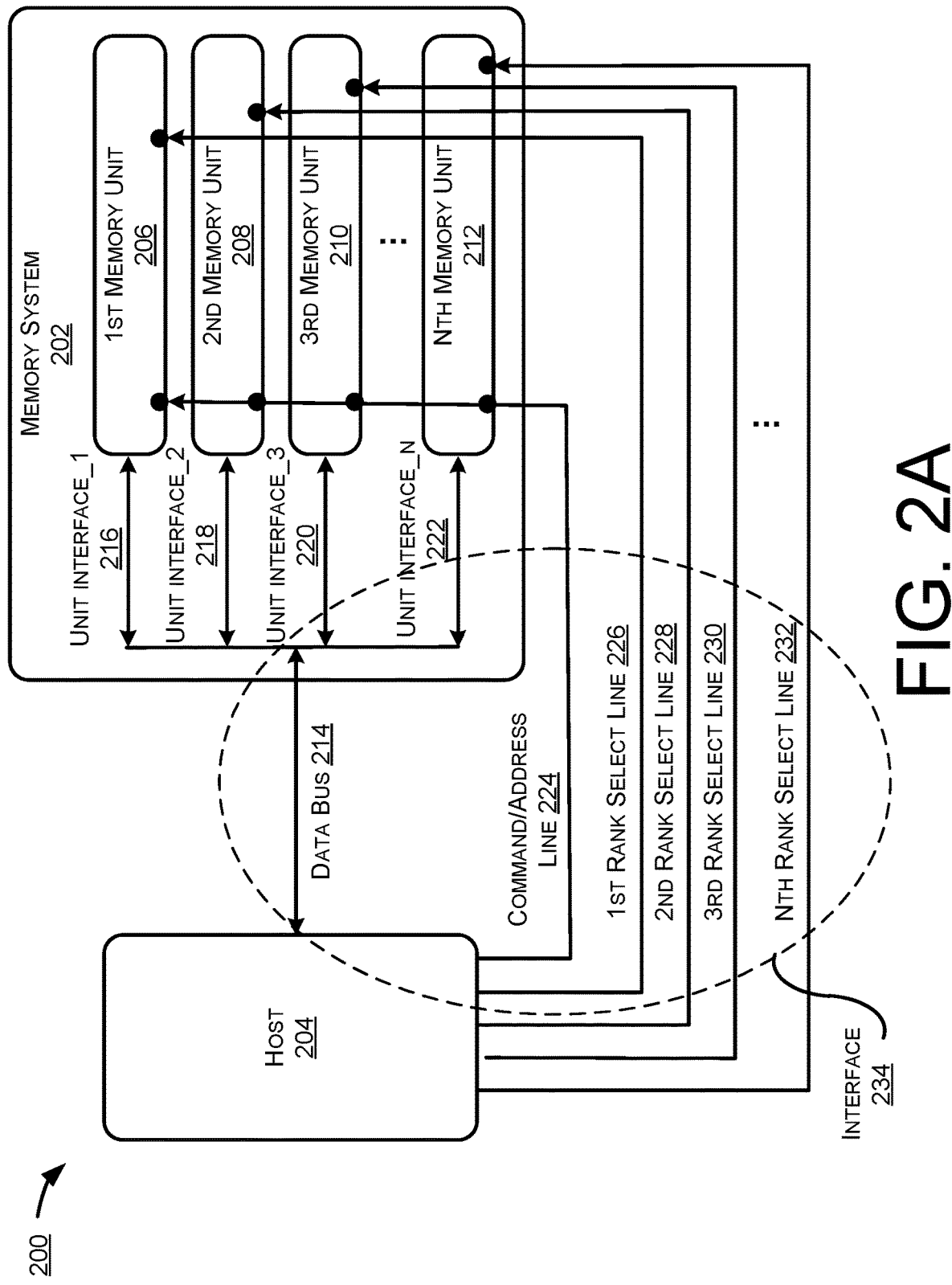
FIG. 2A illustrates an example schematic of communications between a memory system and a host.

FIG. 2A illustrates an example schematic 200 of communications between a memory system 202 and a host 204. In implementations, the memory system 202 may be any suitable type of memory architectures such as a DDR based multi-channel memory architecture and the like. In implementations, the memory system 202 may include volatile memory, such as RAM, DRAM, cache, and the like, and non-volatile, such as ROM, flash memory, miniature hard drive, and the like, or any combination thereof. In implementations, the host may include, but is not limited to, a CPU, an ASIC, a GPU, FPGAs, a DSP, or any combination thereof.

Referring to FIG. 2A, the memory system 202 may include n memory units, including a first memory unit 206, a second memory unit 208, a third memory unit 210, ..., and an $n^{th}$ memory unit 212. By way of example but not limitation, the total number n of memory units in the memory system 202 is a power of 2. In implementations, a respective memory unit of the first memory unit 206, the second memory unit 208, the third memory unit 210, ..., and the $n^{th}$ memory unit 212 may be configured with the accelerator architecture, for example, a PIM architecture and the like. The accelerator architecture is as described above and shall not be repeated herein.

The respective memory unit of the first memory unit 206, the second memory unit 208, the third memory unit 210, ..., and the $n^{th}$ memory unit 212 is configured to transfer data/signals to/from the host 204 over a data bus 214.

In implementations, the data width of the data bus 214 may be any suitable width, for example, 64 bits and the like. In implementations, the data bus 214 may include bidirectional datapaths/channels for the respective memory unit to communicate with the host 204 to transfer data/signals, and the datapaths/channels are referred to as unit interface_1 216, unit interface_2 218, unit interface_3 220, ..., and unit interface_n 222. In implementations, the unit interface_1 216 is configured to transfer data/signals between the first memory unit 206 and the host 204. The unit interface_2 218 is configured to transfer data/signals between the second memory unit 208 and the host 204. The unit interface_3 220 is configured to transfer data/signals between the third memory unit 210 and the host 204. The unit interface_n 222 is configured to transfer data/signals between the memory unit_n 212 and the host 204.

The respective memory unit of the first memory unit 206, the second memory unit 208, the third memory unit 210, ..., and the $n^{th}$ memory unit 212 is further configured to receive command/address signals via the command/address signal line 216 from the host 204.

The first memory unit 206, the second memory unit 208, the third memory unit 210, ..., and the $n^{th}$ memory unit 212 are further configured to receive rank select signals from the host 204. For example, the first memory unit 206 is further configured to receive a first rank select signal via a first rank select line 226 from the host 204. The second memory unit 208 is further configured to receive a second rank select signal via a second rank select line 228 from the host 204. The third memory unit 210 is further configured to receive a third rank select signal via a third rank select line 230 from the host 204. The $n^{th}$ memory unit 212 is further configured to receive an $n^{th}$ rank select signal via an $n^{th}$ rank select line 232 from the host 204.

The host 204 is configured to transfer data/signals to/from the respective memory unit of the first memory unit 206, the second memory unit 208, the third memory unit 210, ..., and the $n^{th}$ memory unit 212 via the data bus 214/respective unit interface 216, 218, 220, or 222.

The host 204 is further configured to send the command/address signals via the command/address line 224 to the respective memory unit of the first memory unit 206, the second memory unit 208, the third memory unit 210, ..., and the $n^{th}$ memory unit 212.

The host 204 is further configured to send rank select signals to the respective memory unit of the first memory unit 206, the second memory unit 208, the third memory unit 210, ..., and the $n^{th}$ memory unit 212 to select/unselect the respective memory unit. For example, the host 204 is further configured to send the first rank select signal via the first rank select line 226 to the first memory unit 206 to select/unselect the first memory unit 206. The host 204 is further configured to send the second rank select signal via the second rank select line 228 to the second memory unit 208 to select/unselect the second memory unit 208. The host 204 is further configured to send the third rank select signal via the third rank select line 230 to the third memory unit 210 to select/unselect the third memory unit 210. The host 204 is further configured to send the $n^{th}$ rank select signal via the $n^{th}$ rank select line 232 to the $n^{th}$ memory unit 212 to select/unselect the $n^{th}$ memory unit 212.

Collectively, the data bus 214, the command/address line 224, the first rank select line 226, the second rank select line 228, the third rank select line 230, ..., and the $n^{th}$ rank select line 232, may be referred to as interface 234. In other words, the interface 234 may include the data bus 214, the command/address line 224, the first rank select line 226, the second rank select line 228, the third rank select line 230, ..., and the $n^{th}$ rank select line 232. The interface 234 is coupled between the host 204 and the memory system 202/the respective memory units. In implementations, the interface 234 may be any suitable memory interfaces, for example, a DDR interface. In implementations, the interface 234 may further include other lines such as clock lines, response signal lines, control signal lines, and the like.

As described above, the conventional DDR interface based memory module is designed with two or more ranks, and only one rank can be selected at a given time. Therefore, all memory chips/units within the same rank are always selected simultaneously and work in lockstep. However, different chips/units within the same rank cannot be selected, controlled, or accessed (read/write) separately.

With the above example schematic 200, the respective memory unit of the first memory unit 206, the second memory unit 208, the third memory unit 210, ..., and the $n^{th}$ memory unit 212 is treated as a rank and is individually selected by the host 204 using the rank select signals 218, 220, 222, ..., and 224. In implementations, only one memory unit can be selected at a given time.

The host 204 is further configured to individually access the respective memory unit of the first memory unit 206, the second memory unit 208, the third memory unit 210, ..., and the $n^{th}$ memory unit 212 via the data bus 214/the unit interfaces 216, 218, 220, and 222. The functions of the data bus 214 and unit interfaces 216, 218, 220, and 222 are as described above and shall not be repeated herein.

For example, the host 204 is further configured to access the first memory unit 206 via the data bus 214/unit interface_1 216 when the first memory unit 206 is selected to perform read and/or write operations. In implementations, though the data bus 214 is shared among the n memory units because only the first memory unit 206 is selected at a given time, the entire data width of data bus 214 is available between the host 204 and the first memory unit 206 during the read and/or write operations.

For example, the host 204 is further configured to access the second memory unit 208 via the data bus 214/unit interface_2 218 when the second memory unit 208 is selected to perform read and/or write operations. In implementations, though the data bus 214 is shared among the n memory units because only the second memory unit 208 is selected at a given time, the entire data width of data bus 214 is available between the host 204 and the second memory unit 208 during the read and/or write operations.

For example, the host 204 is further configured to access the third memory unit 210 via the data bus 214/unit interface_3 220 when the third memory unit 210 is selected to perform read and/or write operations. In implementations, though the data bus 214 is shared among the n memory units because only the third memory unit 210 is selected at a given time, the entire data width of data bus 214 is available between the host 204 and the third memory unit 210 during the read and/or write operations.

For example, the host 204 is further configured to access the $n^{th}$ memory unit 212 via the data bus 214/unit interface_n 222 when the $n^{th}$ memory unit 212 is selected to perform read and/or write operations. In implementations, though the data bus 214 is shared among the n memory units because only the $n^{th}$ memory unit 212 is selected at a given time, the entire data width of data bus 214 is available between the host 204 and the $n^{th}$ memory unit 212 during the read and/or write operations.

With the above example schematic 200, the respective memory units in the memory system 202 can be selected, controlled, and accessed (read/write) by the host 204 individually. Hence, the problem in the conventional DDR based memory that chips/units always work in lockstep can be overcome. Thus, the memory control is improved.

Though FIG. 2A shows n memory units in the memory system 202, the present disclosure is not limited thereto. In implementations, the memory system 202 may include other components. For example, other components may include, but are not limited to, computation units, storage units, accelerator units, control units, or any combination thereof. In implementations, example schematic 200 may be extended to control other components in the memory system 202.

Figure 2B:
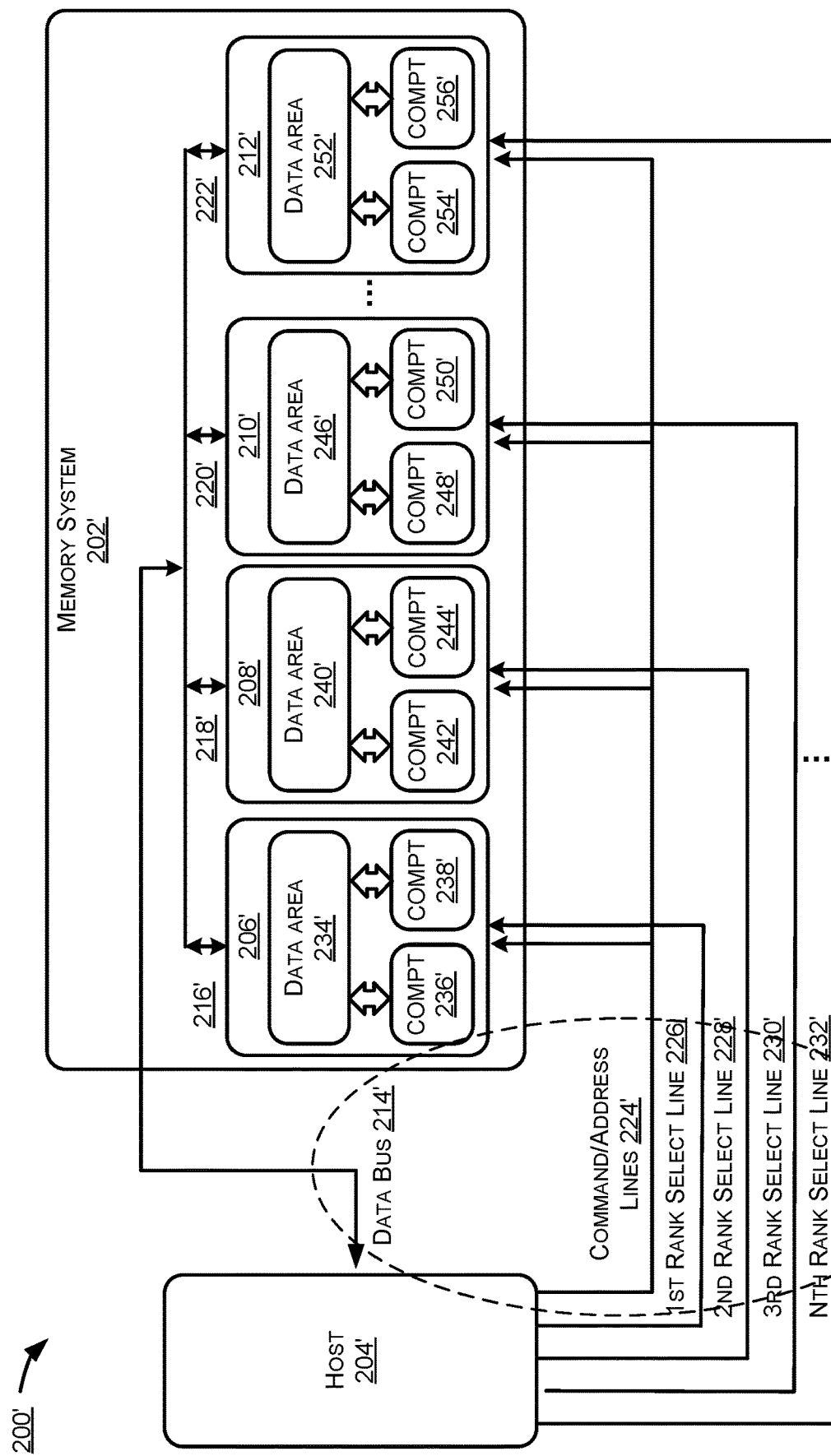
FIG. 2B illustrates an example schematic of communications between a memory system and a host.

FIG. 2B illustrates an example schematic 200' of communications between a memory system 202' and a host 204'. In implementations, the memory system 202' may be any suitable type of memory architectures such as a DDR based multi-channel memory architecture and the like. In implementations, the memory system 202' may include volatile memory, such as RAM, DRAM, cache, and the like, and non-volatile, such as ROM, flash memory, miniature hard drive, and the like, or any combination thereof. In implementations, the host may include, but is not limited to, a CPU, an ASIC, a GPU, FPGAs, a DSP, or any combination thereof.

Referring to FIG. 2B, the memory system 202' may include n memory units, including a first memory unit 206', a second memory unit 208', a third memory unit 210', . . . , and an $n^{th}$ memory unit 212'. By way of example but not limitation, the total number n of memory units in the memory system 202' is a power of 2.

The respective memory unit of the first memory unit 206', the second memory unit 208', the third memory unit 210', . . . , and the $n^{th}$ memory unit 212' is configured to transfer data/signals to/from the host 204' over a data bus 214'.

In implementations, the data width of the data bus 214' may be any suitable width, for example, 64 bits and the like. In implementations, the data bus 214' may include bidirectional datapaths/channels for respective memory unit to communicate with the host 204' to transfer data/signals, and the datapaths/channels are referred to as unit interface_1 216', unit interface_2 218', unit interface_3 220', . . . , and unit interface_n 222'. In implementations, the unit interface_1 216' is configured to transfer data/signals between the first memory unit 206' and the host 204'. The unit interface_2 218' is configured to transfer data/signals between the second memory unit 208' and the host 204'. The unit interface_3 220' is configured to transfer data/signals between the third memory unit 210' and the host 204.' The unit interface_n 222' is configured to transfer data/signals between the memory unit_n 212' and the host 204'.

The respective memory unit of the first memory unit 206', the second memory unit 208', the third memory unit 210', . . . , and the $n^{th}$ memory unit 212' is further configured to receive command/address signals via the command/address signal line 216' from the host 204'.

The first memory unit 206', the second memory unit 208', the third memory unit 210', . . . , and the $n^{th}$ memory unit 212' are further configured to receive rank select signals from the host 204'. For example, the first memory unit 206' is further configured to receive a first rank select signal via a first rank select line 226' from the host 204'. The second memory unit 208' is further configured to receive a second rank select signal via a second rank select line 228' from the host 204'. The third memory unit 210' is further configured to receive a third rank select signal via a third rank select line 230' from the host 204'. The $n^{th}$ memory unit 212' is further configured to receive an $n^{th}$ rank select signal via an $n^{th}$ rank select line 232' from the host 204'.

The host 204' is configured to transfer data/signals to/from the respective memory unit of the first memory unit 206', the second memory unit 208', the third memory unit 210', . . . , and the $n^{th}$ memory unit 212' via the data bus 214'.

The host 204' is further configured to send the command/address signals via the command/address line 224' to the respective memory unit of the first memory unit 206', the second memory unit 208', the third memory unit 210', . . . , and the $n^{th}$ memory unit 212'.

The host 204' is further configured to send rank select signals to the respective memory unit of the first memory unit 206', the second memory unit 208', the third memory unit 210', . . . , and the $n^{th}$ memory unit 212' to select/unselect the respective memory unit. For example, the host 204' is further configured to send the first rank select signal via the first rank select line 226' to the first memory unit 206' to select/unselect the first memory unit 206'. The host 204' is further configured to send the second rank select signal 220' to the second memory unit 208' to select/unselect the second memory unit 208'. The host 204' is further configured to send the third rank select signal via the third rank select line 230' to the third memory unit 210' to select/unselect the third memory unit 210'. The host 204' is further configured to send the $n^{th}$ rank select signal via the $n^{th}$ rank select line 232' to the $n^{th}$ memory unit 212' to select/unselect the $n^{th}$ memory unit 212'.

In implementations, the respective memory unit of the first memory unit 206', the second memory unit 208', the third memory unit 210', . . . , and the nth memory unit 212' may be configured with an accelerator architecture, for example, a PIM architecture, which is described with more details hereinafter. In implementations, first memory unit 206' may include a data area 234' configured to store data, a computation block 236' configured to perform computation, and a computation block 238' configured to perform computation. The data area 234' is further configured to communicate/interact with the computation block 236' and the computation block 238'. Second memory unit 208' may include a data area 240' configured to store data, a computation block 242' configured to perform computation, and a computation block 244' configured to perform computation. The data area 240' is further configured to communicate/interact with the computation block 242' and the computation block 244'. Third memory unit 210' may include a data area 246' configured to store data, a computation block 248' configured to perform computation, and a computation block 250' configured to perform computation. The data area 246' is further configured to communicate/interact with the computation block 248' and the computation block 250'. The $n^{th}$ memory unit 212' may include a data area 252' configured to store data, a computation block 254' configured to perform computation, and a computation block 256' configured to perform computation. The data area 252' is further configured to communicate/interact with the computation block 254' and the computation block 256'. Though FIG. 2B shows that the respective memory unit includes one data area and two computation blocks, the present disclosure is not limited thereto, and the respective memory unit may include other numbers of data areas and computation blocks. Additionally or alternatively, the computation blocks may include data processing units (DPUs). With the PIM architecture, certain kinds of algorithms would be processed by the computation blocks/DPUs inside the memory unit, thereby eliminating some of the costly data movement and massively improving the overall efficiency of computation blocks.

Collectively, the data bus 214', the command/address line 224', the first rank select line 226', the second rank select line 228', the third rank select line 230', . . . , and the $n^{th}$ rank select line 232', may be referred to as interface 258'. In other words, the interface 258' may include the data bus 214', the command/address line 224', the first rank select line 226', the second rank select line 228', the third rank select line 230', . . . , and the $n^{th}$ rank select line 232'. The interface 258' is coupled between the host 204' and the memory system 202'/the respective memory units. In implementations, the interface 258' may be any suitable memory interfaces, for example, a DDR interface. In implementations, the interface 258' may further include other lines such as clock lines, response signal lines, control signal lines, and the like.

As described above, the conventional DDR interface based memory module is designed with two or more ranks, and only one rank can be selected at a given time. Therefore, all memory chips/units within the same rank are always selected simultaneously and work in lockstep. However, different chips/units within the same rank cannot be selected, controlled, or accessed (read/write) separately.

With the above example schematic 200', the respective memory unit of the first memory unit 206', the second memory unit 208', the third memory unit 210', . . . , and the $n^{th}$ memory unit 212' is treated as a rank and is individually selected by the host 204' using the rank select signals 218', 220', 222', and 224'. In implementations, only one memory unit can be selected at a given time.

The host 204' is further configured to individually access the respective memory unit of the first memory unit 206', the second memory unit 208', the third memory unit 210', . . . , and the $n^{th}$ memory unit 212' via the data bus 214/the unit interfaces 216', 218', 220', and 222'. The functions of the data bus 214' and unit interfaces 216', 218', 220', and 222' are as described above and shall not be repeated herein.

For example, the host 204' is further configured to access the first memory unit 206' via the data bus 214'/unit interface_1 216' when the first memory unit 206' is selected to perform read and/or write operations. In implementations, though the data bus 214' is shared among the n memory units, because only the first memory unit 206' is selected at a given time, the entire data width of data bus 214' is available between the host 204' and the first memory unit 206' during the read and/or write operations.

For example, the host 204' is further configured to access the second memory unit 208' via the data bus 214'/unit interface_2 218' when the second memory unit 208' is selected to perform read and/or write operations. In implementations, though the data bus 214' is shared among the n memory units, because only the second memory unit 208' is selected at a given time, the entire data width of data bus 214' is available between the host 204' and the second memory unit 208' during the read and/or write operations.

For example, the host 204' is further configured to access the third memory unit 210' via the data bus 214'/unit interface_3 220' when the third memory unit 210' is selected to perform read and/or write operations. In implementations, though the data bus 214' is shared among the n memory units, because only the third memory unit 210' is selected at a given time, the entire data width of data bus 214' is available between the host 204' and the third memory unit 210' during the read and/or write operations.

For example, the host 204' is further configured to access the $n^{th}$ memory unit 212' via the data bus 214'/unit interface_n 222' when the $n^{th}$ memory unit 212' is selected to perform read and/or write operations. In implementations, though the data bus 214' is shared among the n memory units, because only the $n^{th}$ memory unit 212' is selected at a given time, the entire data width of data bus 214' is available between the host 204' and the $n^{th}$ memory unit 212' during the read and/or write operations.

With the above example schematic 200', the respective memory units in the memory system 202' can be selected, controlled, and accessed (read/write) by the host 204' individually. Hence, the problem in the conventional DDR based memory that chips/units always work in lockstep can be overcome. Thus, the memory control is improved.

Though FIG. 2B shows n memory units in the memory system 202', the present disclosure is not limited thereto. In implementations, the memory system 202' may include other components. For example, other components may include, but are not limited to, computation units, storage units, accelerator units, control units, or any combination thereof. In implementations, example schematic 200' may be extended to control other components in the memory system 202'.

Some characteristics of example schematic 200/200' may include the following.

In implementations, the number of units per memory system n of the memory system 202/202' is less than or equal to the number of ranks in the memory system 202/202'. The number of rank select signals is the same as the number of ranks in the memory system 202/202'. If the memory system has m ranks, where m is a positive integer, there are m rank select signals. With the m rank select signals, the host 204/204' may at most select m memory units individually. Therefore, the number of units per memory system n is less than or equal to the number of ranks m.

In implementations, the maximum system bandwidth of the memory system 202/202' is x GB/s, where x is a positive value. For example, for a DDR4-2400 memory system, x may be 19.2.

In implementations, the maximum unit bandwidth (BW) of a respective memory unit in the memory system 202/202' is x GB/s. For example, only one memory unit is selected at a given time, and thus the entire bandwidth of the memory system 204/204' is available for the selected memory unit during the given time. As such, the maximum unit BW is x GB/s, which is the same as the maximum system bandwidth.

In implementations, the manner of controlling a single unit in example schematic 200/200' is based on the rank select signals.

In implementations, example schematic 200/200' may be applicable where the respective memory unit requires high peak bandwidth.

The above characteristics of example schematic 200/200' are for the purpose of description and are not intended to limit the scope of the present disclosure.

Figure 3A:
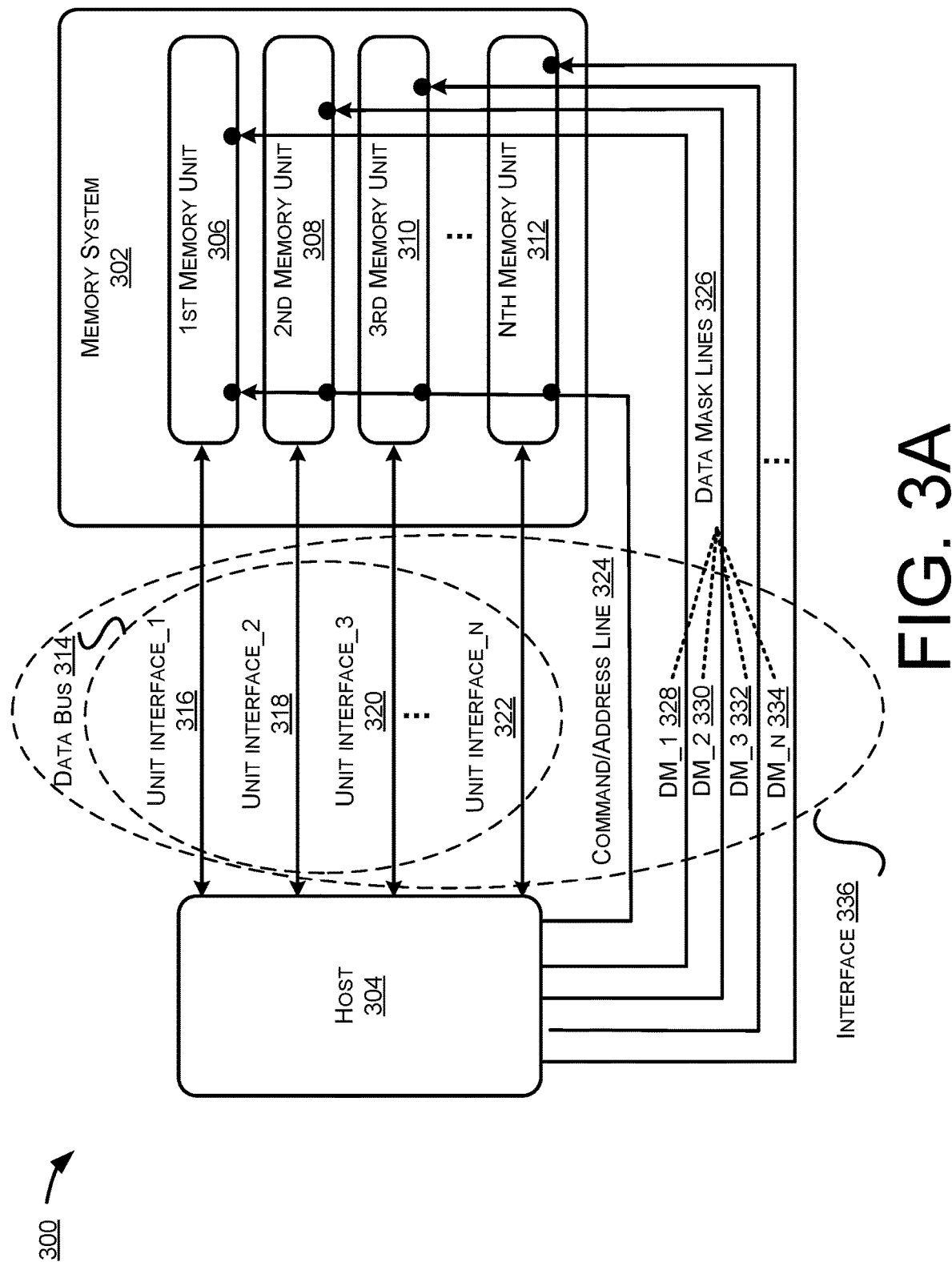
FIG. 3A illustrates an example schematic of communications between a memory system and a host.

FIG. 3A illustrates an example schematic 300 of communications between a memory system 302 and a host 304. In implementations, the memory system 302 may be any suitable type of memory architectures such as a DDR based multi-channel memory architecture and the like. In implementations, the memory system 302 may include volatile memory, such as RAM, DRAM, cache, and the like, and non-volatile, such as ROM, flash memory, miniature hard drive, and the like, or any combination thereof. In implementations, the host may include, but is not limited to, a CPU, an ASIC, a GPU, FPGAs, a DSP, or any combination thereof.

Referring to FIG. 3A, the memory system 302 may include n memory units, including a first memory unit 306, a second memory unit 308, a third memory unit 310, . . . , and an $n^{th}$ memory unit 312. By way of example but not limitation, the total number n of memory units in the memory system 302 is a power of 2. In implementations, a respective memory unit of the first memory unit 306, the second memory unit 308, the third memory unit 310, . . . , and the $n^{th}$ memory unit 312 may be configured with an accelerator architecture, for example, the PIM architecture and the like. The accelerator architecture is as described above and shall not be repeated herein.

The data bus 314 may include bidirectional datapaths/channels for respective memory unit to communicate with the host 304 to transfer data/signals, and the datapaths/channels are referred to as a unit interface_1 316, a unit interface_2 318, a unit interface_3 320, . . . , and a unit interface_n 322. In implementations, the data width of the data bus 314 may be any suitable width, for example, 64 bits and the like. In implementations, the data width of the respective unit interface of the unit interface_1 316, the unit interface_2 318, the unit interface_3 320, . . . , and the unit interface_n 322 may be any suitable width, for example, 16 bits and so on. In implementations, the unit interface_1 316 is configured to transfer data/signals between the first memory unit 306 and the host 304. The unit interface_2 318 is configured to transfer data/signals between the second memory unit 308 and the host 304. The unit interface_3 320 is configured to transfer data/signals between the third memory unit 310 and the host 304. The unit interface_n 322 is configured to transfer data/signals between the memory unit_n 312 and the host 304.

The respective memory unit of the first memory unit 306, the second memory unit 308, the third memory unit 310, . . . , and the $n^{th}$ memory unit 312 is configured to transfer data/signals to/from the host 304 via the data bus 314/respective unit interface 316, 318, 320, or 322. For example, the first memory unit 306 is configured to transfer data/signals to/from the host 304 via the unit interface_1 316. The second memory unit 308 is configured to transfer data/signals to/from the host 304 via the unit interface_2 318. The third memory unit 310 is configured to transfer data/signals to/from the host 304 via the unit interface_3 320. The $n^{th}$ memory unit 312 is configured to transfer data/signals to/from the host 304 via the unit interface_n 322.

The respective memory unit of the first memory unit 306, the second memory unit 308, the third memory unit 310, . . . , and the $n^{th}$ memory unit 312 is further configured to receive command/address signals via command/address line 324 from the host 304.

The first memory unit 306, the second memory unit 308, the third memory unit 310, . . . , and the $n^{th}$ memory unit 312 are further configured to receive Data Mask (DM) signals via data mask signal lines 326 from the host 304. The data mask lines 326 may include n lines, including DM_1 320, DM_2 322, DM_3 324, . . . , and DM_n 326. For example, the first memory unit 306 is further configured to receive a first data mask signal via DM_1 328 from the host 304. The second memory unit 308 is further configured to receive a second data mask signal via DM_2 330 from the host 304. The third memory unit 310 is further configured to receive a third data mask signal via DM_3 332 from the host 304. The $n^{th}$ memory unit 312 is further configured to receive an $n^{th}$ data mask signal via DM_n 334 from the host 304.

The host 304 is configured to transfer data/signals to/from the respective memory unit of the first memory unit 306, the second memory unit 308, the third memory unit 310, . . . , and the $n^{th}$ memory unit 312. For example, the host 304 is further configured to transfer data/signals to/from the first memory unit 306 via the unit interface_1 316. The host is further configured to transfer data/signals to/from the second memory unit 308 via the unit interface_2 318. The host is further configured to transfer data/signals to/from the third memory unit 310 via the unit interface_3 320. The host is further configured to transfer data/signals to/from the $n^{th}$ memory unit 312 via the unit interface_n 322.

The host 304 is further configured to send the command/address signals via command/address line 324 to the respective memory unit of the first memory unit 306, the second memory unit 308, the third memory unit 310, . . . , and the $n^{th}$ memory unit 312.

The host 304 is further configured to send the data mask signals via the data mask lines 326 to the first memory unit 306, the second memory unit 308, the third memory unit 310, . . . , and the $n^{th}$ memory unit 312 to select/unselect the respective memory unit. In implementations, the host 304 may be designed/customized to send multiple data mask signals via multiple data mask lines.

For example, the host 304 is further configured to send the first data mask signal via DM_1 328 to the first memory unit 306 to select/unselect the first memory unit 306. The first data mask signal is configured to mask/unmask the data bits transferred over the unit interface_1 316. When the data bits transferred over the unit interface_1 316 are masked, the data bits transferred over the unit interface_1 316 received by the first memory unit 306 will be ignored. In other words, the first memory unit 306 is unselected. When the data bits transferred over the unit interface_1 316 are unmasked, the data bits transferred over the unit interface_1 316 can be received by the first memory unit 306. In other words, the first memory unit 306 is selected.

For example, the host 304 is further configured to send the second data mask signal via the DM_2 330 to the second memory unit 308 to select/unselect the second memory unit 308. The second data mask signal is configured to mask/unmask the data bits transferred over the unit interface_2 318. When the data bits transferred over the unit interface_2 318 are masked, the data bits transferred over the unit interface_2 318 received by the second memory unit 308 will be ignored. In other words, the second memory unit 308 is unselected. When the data bits transferred over the unit interface_2 318 are unmasked, the data bits transferred over the unit interface_2 318 can be received by the second memory unit 308. In other words, the second memory unit 308 is selected.

For example, the host 304 is further configured to send the third data mask signal via DM_3 332 to the third memory unit 310 to select/unselect the third memory unit 310. The third data mask signal is configured to mask/unmask the data bits transferred over the unit interface_3 320. When the data bits transferred over the unit interface_3 320 are masked, the data bits transferred over the unit interface_3 320 received by the third memory unit 310 will be ignored. In other words, the third memory unit 310 is unselected. When the data bits transferred over the unit interface_3 320 are unmasked, the data bits transferred over the unit interface_3 320 can be received by the third memory unit 310. In other words, the third memory unit 310 is selected.

For example, the host 304 is further configured to send the n$^{th}$ data mask signal via DM_n 334 to the n$^{th}$ memory unit 312 to select/unselect the n$^{th}$ memory unit 312. The n$^{th}$ data mask signal is configured to mask/unmask the data bits transferred over the unit interface_n 322. When the data bits transferred over the unit interface_n 322 are masked, the data bits transferred over the unit interface_n 322 received by the n$^{th}$ memory unit 312 will be ignored. In other words, the n$^{th}$ memory unit 312 is unselected. When the data bits transferred over the unit interface_n 322 are unmasked, the data bits transferred over the unit interface_n 322 can be received by the n$^{th}$ memory unit 312. In other words, the n$^{th}$ memory unit 312 is selected.

More details of corresponding relationships between data mask signals and unit interfaces are described with reference to FIG. 4.

The host 304 is further configured to access the respective memory unit of the first memory unit 306, the second memory unit 308, the third memory unit 310, . . . , and the n$^{th}$ memory unit 312 to perform read and/or write operations. In implementations, the data mask signals are only sent from the host 304 to the memory units during the write operation to select/unselect one or more memory units. During the read operation, the host 304 does not need to send the data mask signals to select/unselect the respective memory unit, because the host 304 may drop an undesired part of the data and keep a desired part of the data read from the memory units.

Collectively, the data bus 314, the command/address line 324, and the data mask lines 326 may be referred to as interface 336. In other words, the interface 336 may include the command/address line 324, and the data mask lines 326. The interface 336 is coupled between the host 304 and the memory system 302/the respective memory units. In implementations, the interface 336 may be any suitable memory interfaces, for example, a DDR interface. In implementations, the interface 336 may further include other lines such as clock lines, response signal lines, control signal lines, and the like.

As described above, in the conventional DDR interface based memory module, all memory chips/units within the same rank are always selected simultaneously and work in lockstep. However, different chips/units cannot be selected, controlled, or accessed (read/write) separately.

With the above example schematic 300, the respective memory units in the memory system 302 can be selected, controlled, and accessed (read/write) by the host 304 individually. Moreover, more than one memory units in the memory system 302 can be selected, controlled, and accessed (read/write) at the same time. Hence, the problem in the conventional DDR based memory that chips/units always work in lockstep can be overcome. Thus, the memory control is improved.

Though FIG. 3A shows n memory units in the memory system 302, the present disclosure is not limited thereto. In implementations, the memory system 302 may include other components. For example, other components may include, but are not limited to, computation units, storage units, accelerator units, control units, or any combination thereof. In implementations, example schematic 300 may be extended to control other components in the memory system 302.

Figure 3B:
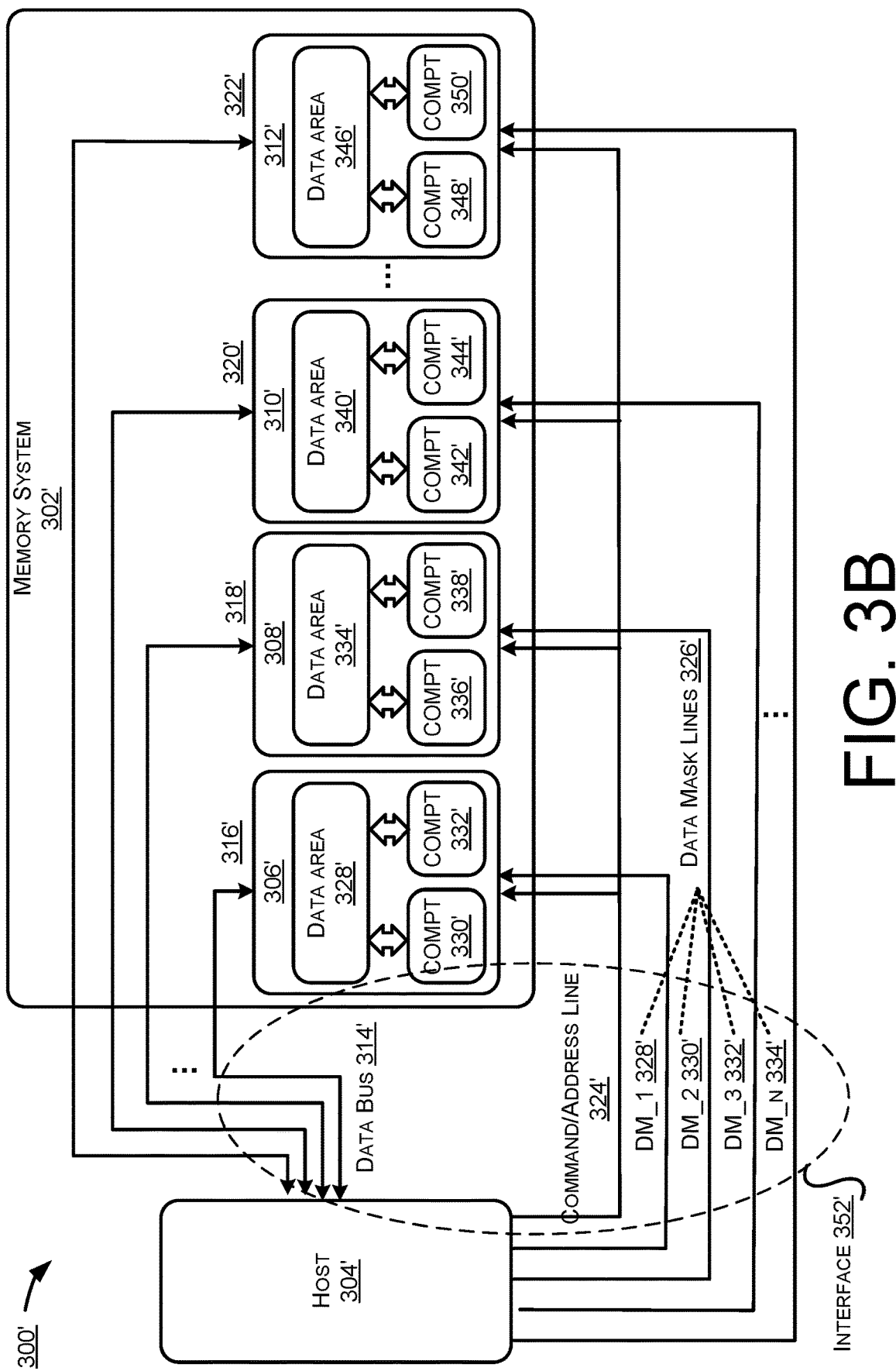
FIG. 3B illustrates an example schematic of communications between a memory system and a host.

FIG. 3B illustrates an example schematic 300' of communications between a memory system 302' and a host 304'. In implementations, the memory system 302' may be any suitable type of memory architectures such as a DDR based multi-channel memory architecture and the like. In implementations, the memory system 302' may include volatile memory, such as RAM, DRAM, cache, and the like, and non-volatile, such as ROM, flash memory, miniature hard drive, and the like, or any combination thereof. In implementations, the host may include, but is not limited to, a CPU, an ASIC, a GPU, FPGAs, a DSP, or any combination thereof.

Referring to FIG. 3B, the memory system 302' may include n memory units, including a first memory unit 306', a second memory unit 308', a third memory unit 310', . . . , and an n$^{th}$ memory unit 312'. By way of example but not limitation, the total number n of memory units in the memory system 302' is a power of 2.

The data bus 314' may include bidirectional datapaths/channels for respective memory unit to communicate with the host 304' to transfer data/signals, and the datapaths/channels are referred to as a unit interface_1 316', a unit interface_2 318', a unit interface_3 320', . . . , and a unit interface_n 322'. In implementations, the data width of the data bus 314' may be any suitable width, for example, 64' bits and so on. In implementations, the data width of the respective unit interface of the unit interface_1' 316', the unit interface_2' 318', the unit interface_3' 320', . . . , and the unit interface_n 322' may be any suitable width, for example, 16' bits and so on. In implementations, the unit interface_1 ' 316' is configured to transfer data/signals between the first memory unit 306' and the host 304'. The unit interface_2' 318' is configured to transfer data/signals between the second memory unit 308' and the host 304'. The unit interface_3' 320' is configured to transfer data/signals between the third memory unit 310' and the host 304'. The unit interface_n 322' is configured to transfer data/signals between the memory unit_n 312' and the host 304'.

The respective memory unit of the first memory unit 306', the second memory unit 308', the third memory unit 310', . . . , and the n$^{th}$ memory unit 312' is configured to transfer data/signals to/from the host 304' via the data bus 314'/respective unit interface 316, 318, 320, or 322. For example, the first memory unit 306' is configured to transfer data/signals to/from the host 304' via the unit interface_1 316'. The second memory unit 308' is configured to transfer data/signals to/from the host 304' via the unit interface_2 318'. The third memory unit 310' is configured to transfer data/signals to/from the host 304' via the unit interface_3 320'. The n$^{th}$ memory unit 312' is configured to transfer data/signals to/from the host 304' via the unit interface_n 322'.

The respective memory unit of the first memory unit 306', the second memory unit 308', the third memory unit 310', . . . , and the n$^{th}$ memory unit 312' is further configured to receive command/address signals via command/address line 324' from the host 304'.

The first memory unit 306', the second memory unit 308', the third memory unit 310', . . . , and the n$^{th}$ memory unit 312' are further configured to receive data mask signals via data mask signal lines 326' from the host 304'. The data mask lines 326' may include n lines, including DM_1 320', DM_2 322', DM_3 324', . . . , and DM_n 326'. For example, the first memory unit 306' is further configured to receive a first data mask signal via DM_1 328' from the host 304'. The second memory unit 308' is further configured to receive a second data mask signal via DM_2 330' from the host 304'. The third memory unit 310' is further configured to receive a third data mask signal via DM_3 332' from the host 304'. The n$^{th}$ memory unit 312' is further configured to receive an n$^{th}$ data mask signal via DM_n 334' from the host 304'.

The host 304' is configured to transfer data/signals to/from the respective memory unit of the first memory unit 306', the second memory unit 308', the third memory unit 310', . . . , and the $n^{th}$ memory unit 312'. For example, the host 304' is further configured to transfer data/signals to/from the first memory unit 306' via the unit interface_1 316'. The host is further configured to transfer data/signals to/from the second memory unit 308' via the unit interface_2 318'. The host is further configured to transfer data/signals to/from the third memory unit 310' via the unit interface_3 320'. The host is further configured to transfer data/signals to/from the $n^{th}$ memory unit 312' via the unit interface_n 322'.

The host 304' is further configured to send the command/address signals via command/address line 324' to the respective memory unit of the first memory unit 306', the second memory unit 308', the third memory unit 310', . . . , and the $n^{th}$ memory unit 312'.

The host 304' is further configured to send the data mask signals via the data mask lines 326' to the first memory unit 306', the second memory unit 308', the third memory unit 310', . . . , and the $n^{th}$ memory unit 312' to select/unselect the respective memory unit. In implementations, the host 304' may be designed/customized to send multiple data mask signals via multiple data mask lines.

For example, the host 304' is further configured to send the first data mask signal via DM_1 328' to the first memory unit 306' to select/unselect the first memory unit 306'. The first data mask signal is configured to mask/unmask the data bits transferred over the unit interface_1 316'. When the data bits transferred over the unit interface_1 316' are masked, the data bits transferred over the unit interface_1 316' received by the first memory unit 306' will be ignored. In other words, the first memory unit 306' is unselected. When the data bits transferred over the unit interface_1 316' are unmasked, the data bits transferred over the unit interface_1 316' can be received by the first memory unit 306'. In other words, the first memory unit 306' is selected.

For example, the host 304' is further configured to send the second data mask signal via the DM_2 330' to the second memory unit 308' to select/unselect the second memory unit 308'. The second data mask signal is configured to mask/unmask the data bits transferred over the unit interface_2 318'. When the data bits transferred over the unit interface_2 318' are masked, the data bits transferred over the unit interface_2 318' received by the second memory unit 308' will be ignored. In other words, the second memory unit 308' is unselected. When the data bits transferred over the unit interface_2 318' are unmasked, the data bits transferred over the unit interface_2 318' can be received by the second memory unit 308'. In other words, the second memory unit 308' is selected.

For example, the host 304' is further configured to send the third data mask signal via DM_3 332' to the third memory unit 310' to select/unselect the third memory unit 310'. The third data mask signal is configured to mask/unmask the data bits transferred over the unit interface_3 320'. When the data bits transferred over the unit interface_3 320' are masked, the data bits transferred over the unit interface_3 320' received by the third memory unit 310' will be ignored. In other words, the third memory unit 310' is unselected. When the data bits transferred over the unit interface_3 320' are unmasked, the data bits transferred over the unit interface_3 320' can be received by the third memory unit 310'. In other words, the third memory unit 310' is selected.

For example, the host 304' is further configured to send the $n^{th}$ data mask signal via DM_n 334' to the $n^{th}$ memory unit 312' to select/unselect the $n^{th}$ memory unit 312'. When the data bits transferred over the unit interface_n 322' are masked, the data bits transferred over the unit interface_n 322' received by the unit $n^{th}$ memory unit 312' will be ignored. In other words, the $n^{th}$ memory unit 312' is unselected. When the data bits transferred over the unit interface_n 322' are unmasked, the data bits transferred over the unit interface_n 322' can be received by the unit $n^{th}$ memory unit 312'. In other words, the $n^{th}$ memory unit 312' is selected.

More details of corresponding relationships between data mask signals and unit interfaces are described with reference to FIG. 4.

The host 304' is further configured to access the respective memory unit of the first memory unit 306', the second memory unit 308', the third memory unit 310', . . . , and the $n^{th}$ memory unit 312' to perform read and/or write operations. In implementations, the data mask signals are only sent from the host 304' to the memory units during the write operation to select/unselect one or more memory units. During the read operation, the host 304' does not need to send the data mask signals to select/unselect the respective memory unit, because the host 304' may drop an undesired part of the data and keep a desired part of the data read from the memory units. Additionally or alternatively, the host 304' may send the data mask signals to select/unselect one or more memory units during both the read and write operations.

In implementations, the respective memory unit of the first memory unit 306', the second memory unit 308', the third memory unit 310', . . . , and the $n^{th}$ memory unit 312' may be configured with an accelerator architecture, for example, the PIM architecture. In implementations, the first memory unit 306' may include a data area 328' configured to store data, a computation block 330' configured to perform computation, and a computation block 332' configured to perform computation. The data area 328' may communicate/interact with the computation block 330' and the computation block 332'. The second memory unit 308' may include a data area 334' configured to store data, a computation block 336' configured to perform computation, and a computation block 338' configured to perform computation. The data area 334' may communicate/interact with the computation block 336' and the computation block 338'. The third memory unit 310' may include a data area 340' configured to store data, a computation block 342' configured to perform computation, and a computation block 344' configured to perform computation. The data area 340' may communicate/interact with the computation block 342' and the computation block 344'. The $n^{th}$ memory unit 312' may include a data area 346' configured to store data, a computation block 348' configured to perform computation, and a computation block 350' configured to perform computation. The data area 346' may communicate/interact with the computation block 348' and the computation block 350'. Though FIG. 3B shows that the respective memory unit includes one data area and two computation blocks, the present disclosure is not limited thereto, and the respective memory unit may include other numbers of data areas and computation blocks. Additionally or alternatively, the computation blocks may include data processing units (DPUs). With the PIM architecture, certain kinds of algorithms would be processed by the computation blocks/DPUs inside the memory unit instead of processing at the CPU, thereby eliminating some of the costly data movement and massively improving the overall efficiency of computations.

Collectively, the data bus 314', the command/address line 324', the data mask lines 326' may be referred to as interface 352'. In other words, the interface 352' may include the data bus 314', the command/address line 324', the data mask lines 326'. The interface 352' is coupled between the host 304' and the memory system 302'/the respective memory units. In implementations, the interface 352' may be any suitable memory interfaces, for example, a DDR interface. In implementations, the interface 352' may further include other lines such as clock lines, response signal lines, control signal lines, and the like.

As described above, in the conventional DDR interface based memory module, all memory chips/units within the same rank are always selected simultaneously and work in lockstep. However, different chips/units cannot be selected, controlled, or accessed (read/write) separately.

With the above example schematic 300', the respective memory units in the memory system 302' can be selected, controlled, and accessed (read/write) by the host 304' individually. Moreover, more than one memory units in the memory system 302' can be selected, controlled, and accessed (read/write) at the same time. Hence, the problem in the conventional DDR based memory that chips/units always work in lockstep can be overcome. Thus, the memory control is improved.

Though FIG. 3B shows n memory units in the memory system 302', the present disclosure is not limited thereto. In implementations, the memory system 302' may include other components. For example, other components may include, but are not limited to, computation units, storage units, accelerator units, control units, or any combination thereof. In implementations, example schematic 300' may be extended to control other components in the memory system 302'.

Some characteristics of example schematic 300/300' may include the following.

In implementations, the number of units per memory system n of the memory system 304/304' is less than or equal to the number of data mask signals. For example, the number of data mask signals is k, where k is a positive integer. Because the host 304/304' sends a respective data mask signal to select/unselect a respective memory unit, the host 304/304' can control at most k memory units. The number of data mask signals may be calculated based on the minimum granularity of the data mask signal.

In implementations, the maximum system bandwidth of the memory system 302/302' is x GB/s, where x is a positive value. For example, for a DDR4-2400 memory system, x may be 19.2.

In implementations, the maximum unit BW of the respective memory unit in the memory system 302/302' is x/n GB/s. Because the entire data bus 314 is divided into n channels, the maximum unit BW of the respective memory unit is x/n GB/s.

In implementations, the manner of controlling a single unit for example schematic 300/300' is based on Data Mask signals.

In implementations, the example schematic 300/300' may be applicable where the one or more memory units to be selected and accessed are changed frequently, because the data mask signals may be generated dynamically and flexibly.

The above characteristics of example schematic 300/300' are for the purpose of description and are not intended to limit the scope of the present disclosure.

FIG. 4 illustrates an example table of corresponding relationships between data mask signals and unit interfaces. Referring to FIG. 4, row 402 illustrates data mask signals, and row 404 illustrates unit interfaces.

Column 406 illustrates that the first data mask signal is configured to mask/unmask the data bits transferred over the unit interface_1. Column 408 illustrates that the second data mask signal is configured to mask/unmask the data bits transferred over the unit interface_2. Column 410 illustrates that the third data mask signal is configured to mask/unmask the data bits transferred over the unit interface_3. Column 412 illustrates that the $n^{th}$ data mask signal is configured to mask/unmask the data bits transferred over the unit interface_3.

Figure 5A:
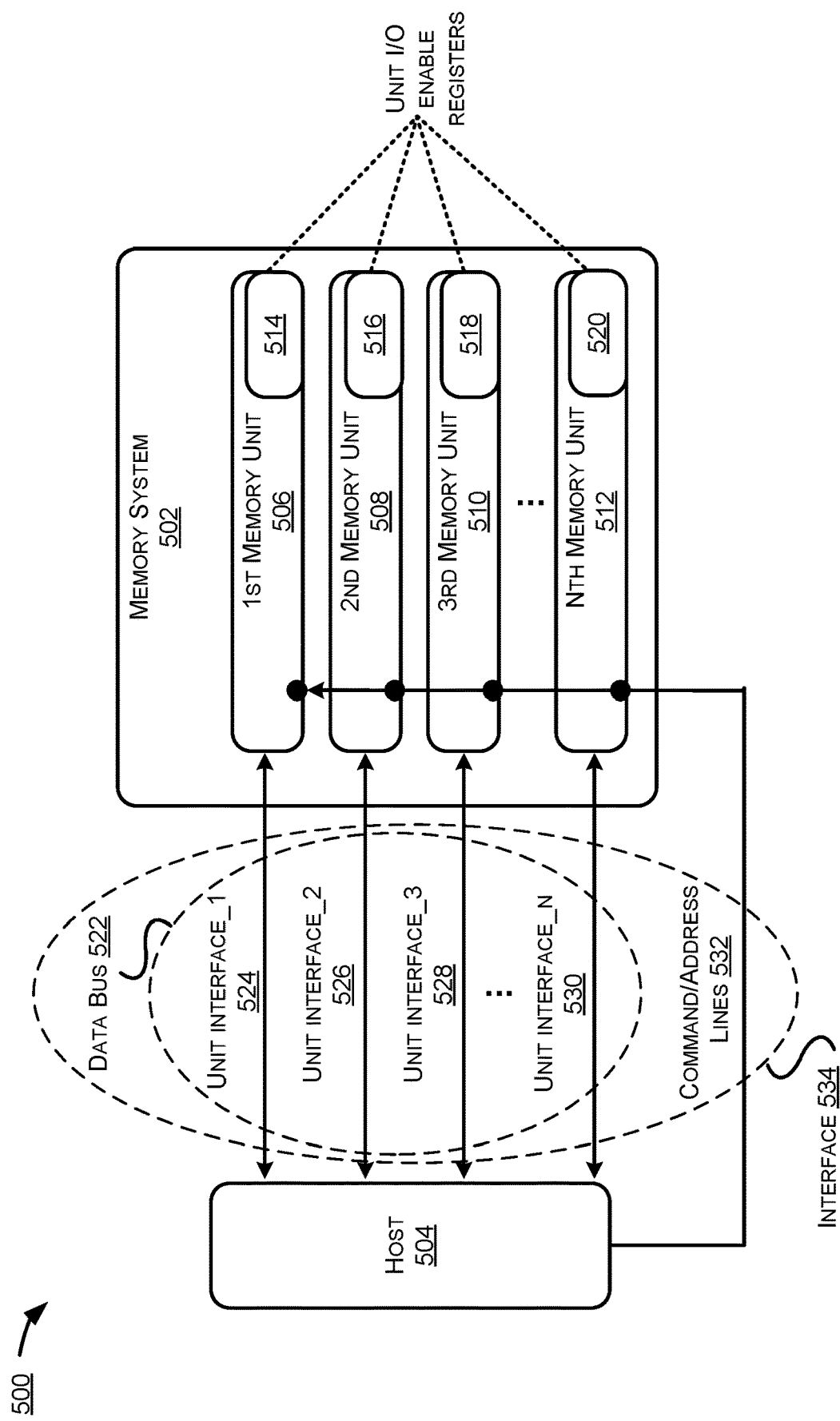
FIG. 5A illustrates an example schematic of communications between a memory system and a host.

FIG. 5A illustrates an example schematic 500 of communications between a memory system 502 and a host 504. In implementations, the memory system 502 may be any suitable type of memory architectures such as a DDR based multi-channel memory architecture and the like. In implementations, the memory system 502 may include volatile memory, such as RAM, DRAM, cache, and the like, and non-volatile, such as ROM, flash memory, miniature hard drive, and the like, or any combination thereof. In implementations, the host may include, but is not limited to, a CPU, an ASIC, a GPU, FPGAs, a DSP, or any combination thereof.

Referring to FIG. 5A, the memory system 502 may include n memory units, including a first memory unit 506, a second memory unit 508, a third memory unit 510, . . . , and an $n^{th}$ memory unit 512. By way of example but not limitation, the total number n of memory units in the memory system 502 is a power of 2. In implementations, a respective memory unit of the first memory unit 506, the second memory unit 508, the third memory unit 510, . . . , and the $n^{th}$ memory unit 512 may be configured with an accelerator architecture, for example, the PIM architecture and the like. The accelerator architecture is as described above and shall not be repeated herein.

The data bus 522 may include bidirectional datapaths/channels for respective memory unit to communicate with the host 504 to transfer data/signals, and the datapaths/channels are referred to as a unit interface_1 524, a unit interface_2 526, a unit interface_3 528, . . . , and a unit interface_n 530. In implementations, the data width of the data bus 522 may be any suitable width, for example, 64 bits and the like. In implementations, the data width of the respective unit interface of the unit interface_1 524, the unit interface_2 526, the unit interface_3 528, . . . , and the unit interface_n 530 may be any suitable width, for example, 16 bits and so on. In implementations, the unit interface_1 524 is configured to transfer data/signals between the first memory unit 506 and the host 504. The unit interface_2 526 is configured to transfer data/signals between the second memory unit 508 and the host 504. The unit interface_3 528 is configured to transfer data/signals between the third memory unit 510 and the host 504. The unit interface_n 530 is configured to transfer data/signals between the memory unit_n 512 and the host 504.

The respective memory unit of the first memory unit 506, the second memory unit 508, the third memory unit 510, . . . , and the $n^{th}$ memory unit 512 may include a respective unit I/O enable register. For example, the first memory unit 506 includes a first unit I/O enable register 514. The second memory unit 508 includes a second unit I/O enable register 516. The third memory unit 510 includes a third unit I/O enable register 518. The $n^{th}$ memory unit 512 includes an $n^{th}$ unit I/O enable register 520.

The respective memory unit of the first memory unit 506, the second memory unit 508, the third memory unit 510, . . . , and the $n^{th}$ memory unit 512 is configured to transfer data/signals to/from the host 504 via the data bus 522/respective unit interface 524, 526, 528, or 530. For example, the first memory unit 506 is configured to transfer data/signals to/from the host 504 via the unit interface_1 524. The second memory unit 508 is configured to transfer data/signals to/from the host 504 via the unit interface_2 526. The third memory unit 510 is configured to transfer data/signals to/from the host 504 via the unit interface_3 528. The $n^{th}$ memory unit 512 is configured to transfer data/signals to/from the host 504 via the unit interface_n 530.

The respective memory unit of the first memory unit 506, the second memory unit 508, the third memory unit 510, . . . , and the $n^{th}$ memory unit 512 is further configured to receive command/address signals via command/address line 532 from the host 504.

The host 504 is configured to transfer data/signals to/from the respective memory unit of the first memory unit 506, the second memory unit 508, the third memory unit 510, . . . , and the $n^{th}$ memory unit 512. For example, the host 504 is further configured to transfer data/signals to/from the first memory unit 506 via the unit interface_1 524. The host is further configured to transfer data/signals to/from the second memory unit 508 via the unit interface_2 526. The host is further configured to transfer data/signals to/from the third memory unit 510 via the unit interface_3 528. The host is further configured to transfer data/signals to/from the $n^{th}$ memory unit 512 via the unit interface_n 530.

The host 504 is further configured to send the command/address signals via command/address line 532 to the respective memory unit of the first memory unit 506, the second memory unit 508, the third memory unit 510, . . . , and the $n^{th}$ memory unit 512.

The host 504 is further configured to send unit I/O enable signals to the respective memory unit of the first memory unit 506, the second memory unit 508, the third memory unit 510, . . . , and the $n^{th}$ memory unit 512 via the data bus 522/respective unit interface 524, 526, 528, and 530 to individually select/unselect the respective memory unit by setting the respective unit I/O enable register. For example, the host 504 is further configured to send a first unit I/O enable signal to the first memory unit 506 via the unit interface_1 524 to select/unselect the first memory unit 506 by setting the first unit I/O enable register 514. The host 504 is further configured to send a second unit I/O enable signal to the second memory unit 508 via the unit interface_2 526 to select/unselect the second memory unit 508 by setting the second unit I/O enable register 516. The host 504 is further configured to send a third unit I/O enable signal to the third memory unit 510 via the unit interface_3 528 to select/unselect the third memory unit 510 by setting the third unit I/O enable register 518. The host 504 is further configured to send an $n^{th}$ unit I/O enable signal to the $n^{th}$ memory unit 512 via the unit interface_n 530 to select/unselect the $n^{th}$ memory unit 512 by setting the $n^{th}$ unit I/O enable register 520.

The host 504 is further configured to access the respective memory unit of the first memory unit 506, the second memory unit 508, the third memory unit 510, . . . , and the $n^{th}$ memory unit 512 to perform read and/or write operations when the respective memory unit is selected.

Each respective unit I/O enable register of the first unit I/O enable register 514, the second unit I/O enable register 516, the third unit I/O enable register 518, . . . , and the $n^{th}$ unit I/O enable register 520 is configured to temporarily enable/disable the I/O function of the respective memory units among the first memory unit 506, the second memory unit 508, the third memory unit 510, . . . , and the $n^{th}$ memory unit 512 in response to receiving the respective unit I/O enable signal. For example, the first unit I/O enable register 514 is configured to temporarily enable/disable the I/O function of the first memory unit 506 in response to receiving the first unit I/O enable signal. The second unit I/O enable register 516 is configured to temporarily enable/disable the I/O function the second memory unit 508 in response to receiving the second unit I/O enable signal. The third unit I/O enable register 518 is configured to temporarily enable/disable the I/O function the third memory unit 510 in response to receiving the third unit I/O enable signal. The $n^{th}$ unit I/O enable register 520 is configured to temporarily enable/disable the I/O function the $n^{th}$ memory unit 512 in response to receiving the $n^{th}$ unit I/O enable signal.

In implementations, if a memory unit in the memory system 502 is idle for a period, the host 504 may send a respective unit I/O enable signal to set the corresponding unit I/O enable register to disable the memory unit for the period. In implementations, setting the unit I/O enable register may cause extra overhead compared with not setting the respective unit I/O enable register, because setting the unit I/O enable register may cause latency, power consumption, and so on.

Collectively, the data bus 522 and the command/address line 532 may be referred to as interface 534. In other words, the interface 534 may include the data bus 522 and the command/address line 532. The interface 534 is coupled between the host 504 and the memory system 502/the respective memory units. In implementations, the interface 534 may be any suitable memory interfaces, for example, a DDR interface. In implementations, the interface 534 may further include other lines such as clock lines, response signal lines, control signal lines, and the like.

As described above, in the conventional DDR interface based memory module, all memory chips/units within the same rank are always selected simultaneously and work in lockstep. However, different chips/units cannot be selected, controlled, or accessed (read/write) separately.

With the above example schematic 500, the respective memory units in the memory system 502 can be selected, controlled, and accessed (read/write) by the host 504 individually. Moreover, more than one memory units in the memory system 502 can be selected, controlled, and accessed (read/write) at the same time. Hence, the problem in the conventional DDR based memory that chips/units always work in lockstep can be overcome. Thus, the memory control is improved.

Though FIG. 5A shows n memory units in the memory system 502, the present disclosure is not limited thereto. In implementations, the memory system 502 may include other components. For example, other components may include, but are not limited to, computation units, storage units, accelerator units, control units, or any combination thereof. In implementations, example schematic 500 may be extended to control other components in the memory system 502.

Figure 5B:
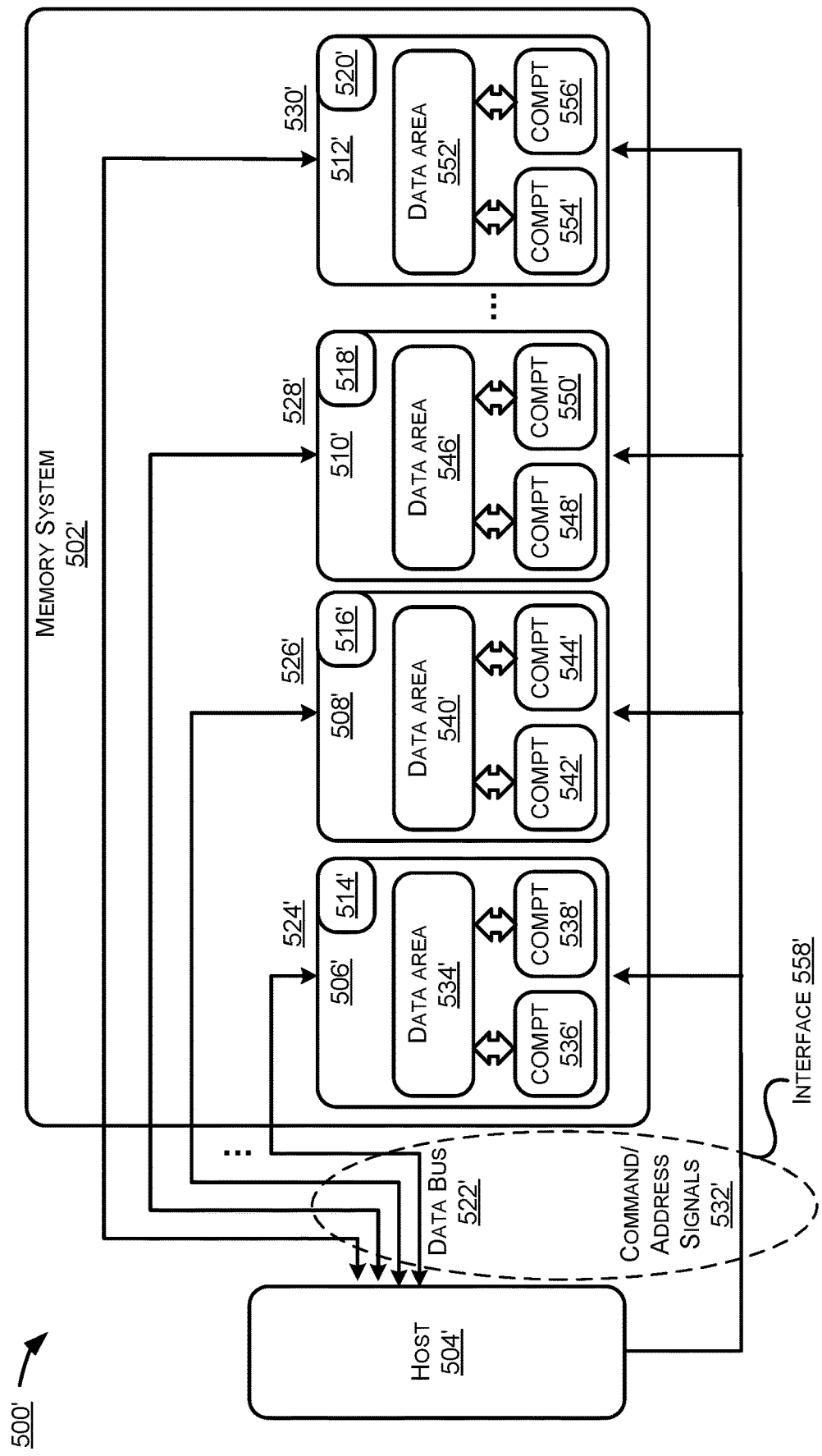
FIG. 5B illustrates an example schematic of communications between a memory system and a host.

FIG. 5B illustrates an example schematic 500' of communications between a memory system 502' and a host 504'. In implementations, the memory system 502' may be any suitable type of memory architectures such as a DDR based multi-channel memory architecture and the like. In implementations, the memory system 502' may include volatile memory, such as RAM, DRAM, cache, and the like, and non-volatile, such as ROM, flash memory, miniature hard drive, and the like, or any combination thereof. In implementations, the host may include, but is not limited to, a CPU, an ASIC, a GPU, FPGAs, a DSP, or any combination thereof.

Referring to FIG. 5B, the memory system 502' may include n memory units, including a first memory unit 506', a second memory unit 508', a third memory unit 510', ..., and an $n^{th}$ memory unit 512'. By way of example but not limitation, the total number n of memory units in the memory system 502' is a power of 2.

The data bus 522' may include bidirectional datapaths/ channels for respective memory unit to communicate with the host 504' to transfer data/signals, and the datapaths/ channels are referred to as a unit interface_1 524', a unit interface_2 526', a unit interface_3 528', ..., and a unit interface_n 530'. In implementations, the data width of the data bus 522' may be any suitable width, for example, 64 bits and the like. In implementations, the data width of the respective unit interface of the unit interface_1 524', the unit interface_2 526', the unit interface_3 528', ..., and the unit interface_n 530' may be any suitable width, for example, 16 bits and so on. In implementations, the unit interface_1 524' is configured to transfer data/signals between the first memory unit 506' and the host 504'. The unit interface_2 526' is configured to transfer data/signals between the second memory unit 508' and the host 504'. The unit interface_3 528' is configured to transfer data/signals between the third memory unit 510' and the host 504'. The unit interface_n 530' is configured to transfer data/signals between the memory unit_n 512' and the host 504'.

The respective memory unit of the first memory unit 506', the second memory unit 508', the third memory unit 510', ..., and the $n^{th}$ memory unit 512' may include a respective unit I/O enable register. For example, the first memory unit 506' includes a first unit I/O enable register 514'. The second memory unit 508' includes a second unit I/O enable register 516'. The third memory unit 510' includes a third unit I/O enable register 518'. The $n^{th}$ memory unit 512' includes an $n^{th}$ unit I/O enable register 520'.

The respective memory unit of the first memory unit 506', the second memory unit 508', the third memory unit 510', ..., and the $n^{th}$ memory unit 512' is configured to transfer data/signals to/from the host 504' via the data bus 522'/respective unit interface 524', 526', 528', or 530'. For example, the first memory unit 506' is configured to transfer data/signals to/from the host 504' via the unit interface_1 524'. The second memory unit 508' is configured to transfer data/signals to/from the host 504' via the unit interface_2 526'. The third memory unit 510' is configured to transfer data/signals to/from the host 504' via the unit interface_3 528'. The $n^{th}$ memory unit 512' is configured to transfer data/signals to/from the host 504' via the unit interface_n 530'.

The respective memory unit of the first memory unit 506', the second memory unit 508', the third memory unit 510', ..., and the $n^{th}$ memory unit 512' is further configured to receive command/address signals via the command/address line 532' from the host 504'.

The host 504' is configured to transfer data/signals to/from the respective memory unit of the first memory unit 506', the second memory unit 508', the third memory unit 510', ..., and the $n^{th}$ memory unit 512'. For example, the host 504' is further configured to transfer data/signals to/from the first memory unit 506' via the unit interface_1 524'. The host is further configured to transfer data/signals to/from the second memory unit 508' via the unit interface_2 526'. The host is further configured to transfer data/signals to/from the third memory unit 510' via the unit interface_3 528'. The host is further configured to transfer data/signals to/from the $n^{th}$ memory unit 512' via the unit interface_n 530'.

The host 504' is further configured to send the command/ address signals via command/address line 532' to the respective memory unit of the first memory unit 506', the second memory unit 508', the third memory unit 510', ..., and the $n^{th}$ memory unit 512'.

The host 504' is further configured to send unit I/O enable signals to the respective memory unit of the first memory unit 506', the second memory unit 508', the third memory unit 510', ..., and the $n^{th}$ memory unit 512' via the data bus 522'/respective unit interface 524', 526', 528', and 530' to individually select/unselect the respective memory unit by setting the respective unit I/O enable register. For example, the host 504' is further configured to send a first unit I/O enable signal to the first memory unit 506' via the unit interface_1 524' to select/unselect the first memory unit 506' by setting the first unit I/O enable register 514'. The host 504' is further configured to send a second unit I/O enable signal to the second memory unit 508' via the unit interface_2 526' to select/unselect the second memory unit 508' by setting the second unit I/O enable register 516'. The host 504' is further configured to send a third unit I/O enable signal to the third memory unit 510' via the unit interface_3 528' to select/ unselect the third memory unit 510' by setting the third unit I/O enable register 518'. The host 504' is further configured to send an $n^{th}$ unit I/O enable signal to the $n^{th}$ memory unit 512' via the unit interface_n 530' to select/unselect the $n^{th}$ memory unit 512' by setting the $n^{th}$ unit I/O enable register 520'.

The host 504' is further configured to access the respective memory unit of the first memory unit 506', the second memory unit 508', the third memory unit 510', ..., and the $n^{th}$ memory unit 512' to perform read and/or write operations when the respective memory unit is selected.

The respective unit I/O enable register of the first unit I/O enable register 514', the second unit I/O enable register 516', the third unit I/O enable register 518', ..., and the $n^{th}$ unit I/O enable register 520' is configured to temporarily enable/ disable the I/O function of the respective memory unit of the first memory unit 506', the second memory unit 508', the third memory unit 510', ..., and the $n^{th}$ memory unit 512' in response to receiving the respective unit I/O enable signal. For example, the first unit I/O enable register 514' is configured to temporarily enable/disable the I/O function the first memory unit 506' in response to receiving the first unit I/O enable signal. The second unit I/O enable register 516' is configured to temporarily enable/disable the I/O function the second memory unit 508' in response to receiving the second unit I/O enable signal. The third unit I/O enable register 518' is configured to temporarily enable/disable the I/O function the third memory unit 510' in response to receiving the third unit I/O enable signal. The $n^{th}$ unit I/O enable register 520' is configured to temporarily enable/ disable the I/O function the $n^{th}$ memory unit 512' in response to receiving the $n^{th}$ unit I/O enable signal.

In implementations, if a memory unit in the memory system 502' is idle for a period, the host 504' may send a respective unit I/O enable signal to set the corresponding unit I/O enable register to disable the memory unit for the period. In implementations, setting the unit I/O enable register may cause extra overhead compared with not setting the respective unit I/O enable register, because setting the unit I/O enable register may cause latency, power consumption, and so on.

Collectively, the data bus 522' and the command/address line 532' may be referred to as interface 558'. In other words, the interface 558' may include the data bus 522' and the command/address line 532'. The interface 558' is coupled between the host 504 and the memory system 502/the respective memory units. In implementations, the interface 558' may be any suitable memory interfaces, for example, a DDR interface. In implementations, the interface 558' may further include other lines such as clock lines, response signal lines, control signal lines, and the like.

As described above, in the conventional DDR interface based memory module, all memory chips/units within the same rank are always selected simultaneously and work in lockstep. However, different chips/units cannot be selected, controlled, or accessed (read/write) separately.

With the above example schematic 500', the respective memory units in the memory system 502' can be selected, controlled, and accessed (read/write) by the host 504' individually. Moreover, more than one memory units in the memory system 502' can be selected, controlled, and accessed (read/write) at the same time. Hence, the problem in the conventional DDR based memory that chips/units always work in lockstep can be overcome. Thus, the memory control is improved.

Though FIG. 5B shows n memory units in the memory system 502', the present disclosure is not limited thereto. In implementations, the memory system 502' may include other components. For example, other components may include, but are not limited to, computation units, storage units, accelerator units, control units, or any combination thereof. In implementations, example schematic 500' may be extended to control other components in the memory system 502'.

Some characteristics of example schematic 500/500' may include the following.

In implementations, the number of units per memory system n of the memory system 502/502' is less than or equal to the value of the data width of data bus 522/522'. For example, if the data width of data bus 522/522' is 64 bits, the data bus 522/522' may include 64 channels at most. In that case, the host 504/504' may at most send 64 unit enable signals to 64 memory units via the 64 channels individually. Thus, the number of units per memory system n is less than or equal to the value of the data width of the data bus 522/522'.

In implementations, the maximum system bandwidth of the memory system 502/502' is x GB/s. For example, for a DDR4-2400 memory system, x may be 19.2.

In implementations, the maximum unit BW of a respective memory unit in the memory system 502/502' is x/n GB/s. Because the entire data bus 522/522' is divided into n channels, the maximum unit BW of the respective memory unit is x/n GB/s.

In implementations, the manner of controlling a single unit in example schematic 500/500' is based on unit I/O enable signals and unit I/O enable registers.

In implementations, example schematic 500/500' may be applicable where one or more memory units can be idle for a period.

The above characteristics of example schematic 500/500' are for the purpose of description and are not intended to limit the scope of the present disclosure.

FIG. 6 illustrates an example table 600 of characteristics of example option 1, example option 2, and example option 3. In implementations, example option 1 may include example schematic 200/200' described above with reference to FIG. 2A and FIG. 2B. Example option 2 may include example schematic 300/300' described above with reference to FIG. 3A and FIG. 3B. Example option 3 may include example schematic 500/500' described above with reference to FIG. 5A and FIG. 5B.

Row 602 illustrates the number of units per memory system of example option 1, example option 2, and example option 3.

Row 604 illustrates the maximum system bandwidth of example option 1, example option 2, and example option 3.

Row 606 illustrates the maximum unit BW of example option 1, example option 2, and example option 3.

Row 608 illustrates the manner of controlling a single unit of example option 1, example option 2, and example option 3.

Row 610 illustrates the PCB routing/signal integrity of example option 1, example option 2, and example option 3.

Row 612 illustrates extra overhead of example option 1, example option 2, and example option 3.

Row 614 illustrates considerations of example option 1, example option 2, and example option 3.

Row 616 illustrates the application of example option 1, example option 2, and example option 3.

Column 618 illustrates the characteristics of example option 1. For example, the number of units per memory system n of example option 1 is less than or equal to the number of ranks. The maximum system bandwidth of example option 1 is x GB/s, where x is a positive value. The maximum unit BW of example option 1 is x GB/s. The manner of controlling a single unit of example option 1 is based on rank select signals. In implementations, the manner of controlling a single unit of example option 1 may include unit select and row address. The PCB routing/signal integrity is relatively difficult to design for example option 1. There is no extra overhead for example option 1. Considerations of implementing example option 1 may include routability. Regarding application, example option 1 may be applicable where the respective memory unit requires high peak bandwidth.

Column 620 illustrates the characteristics of example option 2. For example, the number of units per memory system n of example option 2 is less than or equal to the number of data mask signals. The number of data mask signals may be calculated as described above, which shall not be repeated herein. The maximum system bandwidth of example option 2 is x GB/s. The maximum unit BW of example option 2 is x/n GB/s. The manner of controlling a single unit of example option 2 is based on data mask signals. The PCB routing/signal integrity is relatively easy for example option 2. There is no extra overhead for example option 2. Considerations of implementing example option 2 may include that the data mask signals are only applied during the write operation, and the minimum granularity of the data mask is regulated by DDR protocols. Regarding application, example option 2 may be applicable where the one or more memory units to be selected and accessed are changed frequently.

Column 622 illustrates the characteristics of example option 3. For example, the number of units per memory system n of example option 3 is less than or equal to the value of the data width of the data bus. The maximum system bandwidth of example option 3 is x GB/s. The maximum unit BW of example option 3 is x/n GB/s. The manner of controlling a single unit of example option 3 is based on unit I/O enable signals and unit I/O enable resisters. The PCB routing/signal integrity is relatively easy for example option 3. There is extra overhead for example option 3 as described above. Considerations of implementing example option 3 may include the extra overhead.

Regarding application, example option 3 may be applicable where one or more memory units can be idle for a period.

The above characteristics of example option 1, example option 2, and example option 3 are for the purpose of description and are not intended to limit the scope of the present disclosure.

In implementations, different types of signals may be used in combination to control the memory system including a plurality of memory units to achieve more complex control to adapt to different usage scenarios. For example, the rank select signals and the data mask signals may be used in combination to form a hybrid control manner. The rank select signals and the unit I/O enable register signals may be used in combination to form another hybrid control manner. The data mask signals and the unit I/O enable register signals may be used in combination to form yet another hybrid control manner. The hybrid control manners described herein are for the purpose of illustration rather than limitation. Moreover, the rank select signals, the data mask signals, and the unit I/O enable register signals may be used in combination to form other hybrid control manners. More details are described hereinafter with reference to FIG. 7, FIG. 8, and FIG. 9.

Figure 7:
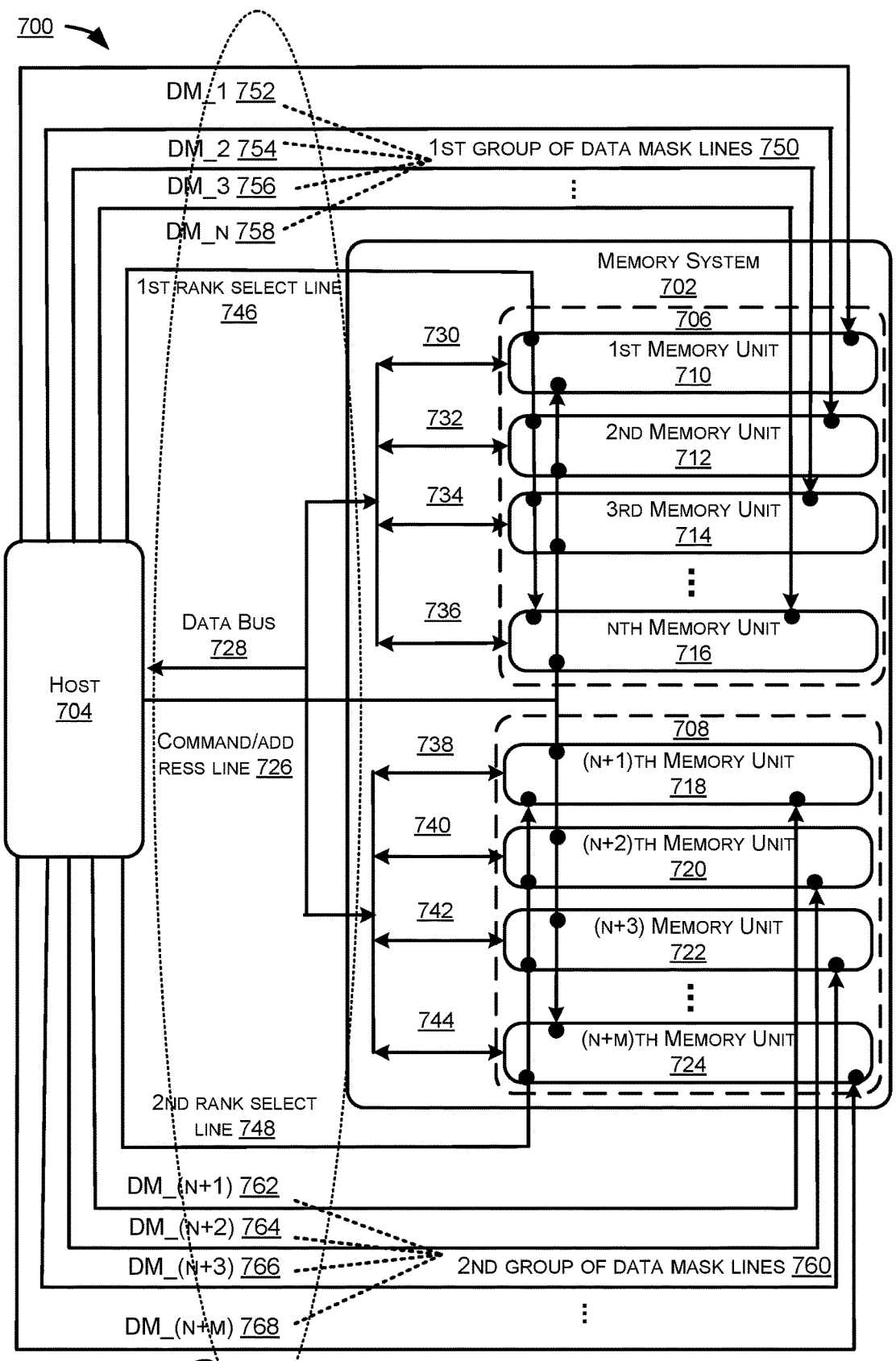
FIG. 7 illustrates an example schematic of communications between a memory system and a host.

FIG. 7 illustrates an example schematic 700 of communications between a memory system 702 and a host 704, where different types of signals, i.e., the rank select signals and the data mask signals are used in combination to form a hybrid control manner. In implementations, the memory system 702 may be any suitable type of memory architectures such as a DDR based multi-channel memory architecture and the like. In implementations, the memory system 702 may include volatile memory, such as RAM, DRAM, cache, and the like, and non-volatile, such as ROM, flash memory, miniature hard drive, and the like, or any combination thereof. In implementations, the host 704 may include, but is not limited to, a CPU, an ASIC, a GPU, FPGAs, a DSP, or any combination thereof.

Referring to FIG. 7, the memory system 702 may include a first group 706 of memory units and a second group 708 of memory units. The first group 706 may include n memory units, including a first memory unit 710, a second memory unit 712, a third memory unit 714, . . . , and an $n^{th}$ memory unit 716. The second group 708 may include m memory units, including an (n+1)th memory unit 718, an (n+2)th memory unit 720, . . . , and an (n+m)th memory unit 724. By way of example but not limitation, the number n and m are powers of 2. Though FIG. 7 shows two groups of memory units, the present disclosure is not limited thereto. The memory system 702 may include more than two groups of memory units.

In implementations, a respective memory unit of the first memory unit 710, the second memory unit 712, the third memory unit 714, . . . , and the $n^{th}$ memory unit 716, the (n+1)th memory unit 718, the (n+2)th memory unit 720, . . . , and the (n+m)th memory unit 724 may be configured with the accelerator architecture, for example, the PIM architecture and the like. The accelerator architecture and the PIM architecture are as described above and shall not be repeated herein.

The respective memory unit of the first memory unit 710, the second memory unit 712, the third memory unit 714, . . . , and the $n^{th}$ memory unit 716, the (n+1)th memory unit 718, the (n+2)th memory unit 720, . . . , and the (n+m)th memory unit 724 is configured to receive command/address signals via the command/address signal line 726 from the host 704.

The respective memory unit of the first memory unit 710, the second memory unit 712, the third memory unit 714, . . . , and the $n^{th}$ memory unit 716, the (n+1)th memory unit 718, the (n+2)th memory unit 720, . . . , and the (n+m)th memory unit 724 is further configured to transfer data/signals to/from the host 704 over a data bus 728.

In implementations, the data width of the data bus 714 may be any suitable width, for example, 64 bits and the like. In implementations, the data bus 714 may include bidirectional datapaths/channels for respective memory unit to communicate with the host 704 to transfer data/signals, and the datapaths/channels are referred to as unit interface_1 730, unit interface_2 732, unit interface_3 734, . . . , unit interface_n 736, unit interface (n+1) 738, unit interface (n+2) 740, unit interface (n+3) 742, . . . , unit interface (n+m) 744. The data width of the respective unit interface may be any suitable width, for example, 16 bits and the like.

In implementations, the unit interface_1 730 is configured to transfer data/signals between the first memory unit 710 and the host 704. The unit interface_2 712 is configured to transfer data/signals between the first memory unit 714 and the host 704. The unit interface_3 734 is configured to transfer data/signals between the first memory unit 714 and the host 704. The unit interface_n 736 is configured to transfer data/signals between the first memory unit 716 and the host 704. The unit interface (n+1) 738 is configured to transfer data/signals between the first memory unit 718 and the host 704. The unit interface (n+2) 740 is configured to transfer data/signals between the first memory unit 720 and the host 704. The unit interface (n+3) 742 is configured to transfer data/signals between the first memory unit 722 and the host 704. The unit interface (n+m) 744 is configured to transfer data/signals between the first memory unit 724 and the host 704.

In the first group 706, the respective memory unit of the first memory unit 710, the second memory unit 712, the third memory unit 714, . . . , and the $n^{th}$ memory unit 716 are further configured to receive a first rank select signal via a first rank select line 746 from the host 704. In implementations, the first group of memory units are selected/unselected together by the first rank select signal.

In the second group 708, the respective memory unit of the (n+1)th memory unit 718, the (n+2)th memory unit 720, . . . , and the (n+m)th memory unit 724 are further configured to receive a second rank select signal via a second rank select line 748 from the host 704. In implementations, the second group of memory units are selected/unselected together by the second rank select signal.

In the first group 706, the respective memory unit of the first memory unit 710, the second memory unit 712, the third memory unit 714, . . . , and the $n^{th}$ memory unit 716 are further configured to receive data mask signals via a first group of data mask lines 750 from the host 704. The first group of data mask lines 750 may include n lines, including DM_1 752, DM_2 754, DM_3 756, . . . , and DM_n 758. For example, the first memory unit 710 is further configured to receive a first data mask signal via DM_1 752 from the host 704. The second memory unit 712 is further configured to receive a second data mask signal via DM_2 754 from the host 704. The third memory unit 714 is further configured to receive a third data mask signal via DM_3 756 from the host 704. The $n^{th}$ memory unit 716 is further configured to receive an $n^{th}$ data mask signal via DM_n 758 from the host 704.

In the second group 708, the respective memory unit of the (n+1)th memory unit 718, the (n+2)th memory unit 720, . . . , and the (n+m)th memory unit 724 are further configured to receive data mask signals via a second group of data mask lines 750 from the host 704. The second group of data mask lines 752 may include n lines, including DM_(n+1) 762, DM_(n+2) 764, DM_(n+3) 766, ..., and DM_(n+m) 768. For example, the (n+1)th memory unit 718 is further configured to receive an (n+1)th data mask signal via DM_(n+1) 762 from the host 704. The (n+2)th memory unit 720 is further configured to receive an (n+2)th data mask signal via DM_(n+2) 764 from the host 704. The (n+3)th memory unit 722 is further configured to receive an (n+3)th data mask signal via DM_(n+3) 766 from the host 704. The (n+m)th memory unit 724 is further configured to receive an (n+m)th data mask signal via DM_(n+m) 768 from the host 704.

The host 704 is configured to transfer data/signals to/from the respective memory unit via the data bus 728/respective unit interface 730, 732, 734, 736, 738, 740, 742, or 744. The functions of the data bus 728 and unit interfaces 730, 732, 734, 736, 738, 740, 742, and 744 are as described above and shall not be repeated herein.

The host 704 is further configured to send the command/address signals via the command/address line 726 to the respective memory unit of the first memory unit 710, the second memory unit 712, the third memory unit 714, ..., and the $n^{th}$ memory unit 716, the (n+1)th memory unit 718, the (n+2)th memory unit 720, ..., and the (n+m)th memory unit 724.

The host 704 is further configured to send the first rank select signal via the first rank select line 746 to the respective memory unit in the first group 706. The host 704 is further configured to send the second rank select signal via the second rank select line 748 to the respective memory unit in the second group 708. Thus, the n memory units in the first group 706 are selected together by the first rank select signal, and the m memory units in the second group 708 are selected together by the second rank select signal.

The host 704 is further configured to send the data mask signals via the first group of data mask lines 750 to the first group 706 of memory units, and send the data mask signals via the second group of data mask lines 760 to the second group 708 of memory units. In implementations, the host 704 may be designed/customized to send multiple data mask signals via multiple data mask lines.

For example, the host 704 is further configured to send the first data mask signal via DM_1 752 to the first memory unit 710. The first data mask signal is configured to select/unselect the first memory unit 710. The first data mask signal is configured to mask/unmask the data bits transferred over the unit interface_1 730. When the data bits transferred over the unit interface_1 730 are masked, the data bits transferred over the unit interface_1 730 received by the first memory unit 710 will be ignored. In other words, the first memory unit 710 is unselected. When the data bits transferred over the unit interface_1 730 are unmasked, the data bits transferred over the unit interface_1 730 can be received by the first memory unit 710. In other words, the first memory unit 710 is selected.

For example, the host 704 is further configured to send the second data mask signal via the DM_2 754 to the second memory unit 712 to select/unselect the second memory unit 712. The second data mask signal is configured to mask/unmask the data bits transferred over the unit interface_2 732. When the data bits transferred over the unit interface_2 732 are masked, the data bits transferred over the unit interface_2 732 received by the second memory unit 712 will be ignored. In other words, the second memory unit 712 is unselected. When the data bits transferred over the unit interface_2 732 are unmasked, the data bits transferred over the unit interface_2 732 can be received by the second memory unit 712. In other words, the second memory unit 712 is selected.

For example, the host 704 is further configured to send the third data mask signal via DM_3 756 to the third memory unit 714 to select/unselect the third memory unit 714. The third data mask signal is configured to mask/unmask the data bits transferred over the unit interface_3 734. When the data bits transferred over the unit interface_3 734 are masked, the data bits transferred over the unit interface_3 734 received by the third memory unit 714 will be ignored. In other words, the third memory unit 714 is unselected. When the data bits transferred over the unit interface_3 734 are unmasked, the data bits transferred over the unit interface_3 734 can be received by the third memory unit 714. In other words, the third memory unit 714 is selected.

For example, the host 704 is further configured to send the $n^{th}$ data mask signal via DM_n 758 to the $n^{th}$ memory unit 716 to select/unselect the $n^{th}$ memory unit 716. The $n^{th}$ data mask signal is configured to mask/unmask the data bits transferred over the unit interface_n 736. When the data bits transferred over the unit interface_n 736 are masked, the data bits transferred over the unit interface_n 736 received by the $n^{th}$ memory unit 716 will be ignored. In other words, the $n^{th}$ memory unit 716 is unselected. When the data bits transferred over the unit interface_n 736 are unmasked, the data bits transferred over the unit interface_n 736 can be received by the $n^{th}$ memory unit 716. In other words, the $n^{th}$ memory unit 716 is selected.

For example, the host 704 is further configured to send the (n+1)th data mask signal via DM_(n+1) 762 to the (n+1)th memory unit 718 to select/unselect the (n+1)th memory unit. The (n+1)th data mask signal is configured to mask/unmask the data bits transferred over the unit interface (n+1) 738. When the data bits transferred over the unit interface (n+1) 738 are masked, the data bits transferred over the unit interface (n+1) 738 received by the (n+1)th memory unit 718 will be ignored. In other words, the (n+1)th memory unit 718 is unselected. When the data bits transferred over the unit interface (n+1) 738 are unmasked, the data bits transferred over the unit interface (n+1) 738 can be received by the (n+1)th memory unit 718. In other words, the (n+1)th memory unit 718 is selected.

For example, the host 704 is further configured to send the (n+2)th data mask signal via the DM_(n+2) 764 to the (n+2)th memory unit 720 to select/unselect the (n+2)th memory unit 720. The (n+2)th data mask signal is configured to mask/unmask the data bits transferred over the unit interface (n+2) 704. When the data bits transferred over the unit interface (n+2) 704 are masked, the data bits transferred over the unit interface (n+2) 704 received by the (n+2)th memory unit 720 will be ignored. In other words, the (n+2)th memory unit 720 is unselected. When the data bits transferred over the unit interface (n+2) 704 are unmasked, the data bits transferred over the unit interface (n+2) 704 can be received by the (n+2)th memory unit 720. In other words, the (n+2)th memory unit 720 is selected.

For example, the host 704 is further configured to send the (n+3)th data mask signal via DM_(n+3) 766 to the (n+3)th memory unit 722 to select/unselect the (n+3)th memory unit 722. The (n+3)th data mask signal is configured to mask/unmask the data bits transferred over the unit interface (n+3) 742. When the data bits transferred over the unit interface (n+3) 742 are masked, the data bits transferred over the unit interface (n+3) 742 received by the (n+3)th memory unit 722 will be ignored. In other words, the (n+3)th memory unit 722 is unselected. When the data bits transferred over the unit interface (n+3) 742 are unmasked, the data bits transferred over the unit interface (n+3) 742 can be received by the (n+3)th memory unit 722. In other words, the (n+3)th memory unit 722 is selected.

For example, the host 704 is further configured to send the (n+m)th data mask signal via DM_(n+m) 768 to the (n+m)th memory unit 724 to select/unselect the (n+m)th memory unit 724. The (n+m)th data mask signal is configured to mask/unmask the data bits transferred over the unit interface (n+m) 744. When the data bits transferred over the unit interface (n+m) 744 are masked, the data bits transferred over the unit interface (n+m) 744 received by the (n+m)th memory unit 724 will be ignored. In other words, the (n+m)th memory unit 724 is unselected. When the data bits transferred over the unit interface (n+m) 744 are unmasked, the data bits transferred over the unit interface (n+m) 744 can be received by the (n+m)th memory unit 724. In other words, the (n+m)th memory unit 724 is selected.

The host 704 is further configured to individually access the respective memory unit of the first memory unit 710, the second memory unit 712, the third memory unit 714, . . . , and the $n^{th}$ memory unit 716, the (n+1)th memory unit 718, the (n+2)th memory unit 720, . . . , and the (n+m)th memory unit 724 via the data bus 728/respective unit interface to perform read and/or write operations. The functions of the data bus 728 and unit interfaces 730, 732, 734, 736, 738, 740, 742, and 744 are as described above and shall not be repeated herein.

Collectively, the data bus 728, the command/address line 726, the first rank select line 746, the second rank select line 748, the first group of data mask lines 750, and the second group of data mask lines 760 may be referred to as interface 770. In other words, the interface may include the data bus 728, the command/address line 726, the first rank select line 746, the second rank select line 748, the first group of data mask lines 750, and the second group of data mask lines 760. The interface 770 is coupled between the host 704 and the memory system 702/the respective memory units. In implementations, the interface 770 may be any suitable memory interfaces, for example, a DDR interface. In implementations, the interface 770 may further include other lines such as clock lines, response signal lines, control signal lines, and the like.

As described above, in the conventional DDR interface based memory module, all memory chips/units within the same rank are always selected simultaneously and work in lockstep. However, different chips/units cannot be selected, controlled, or accessed (read/write) separately.

With the above example schematic 700, a group of memory units can be selected by the rank signal, and one or more memory units within the selected group can be further selected by the data mask signals. Therefore, the host can select, control, and access (read/write) the respective memory unit in the memory system 702 individually with accuracy and flexibility even if the memory units are arranged in groups. Hence, the problem in the conventional DDR based memory that chips/units always work in lockstep can be overcome. Thus, the memory control is improved.

Figure 8:
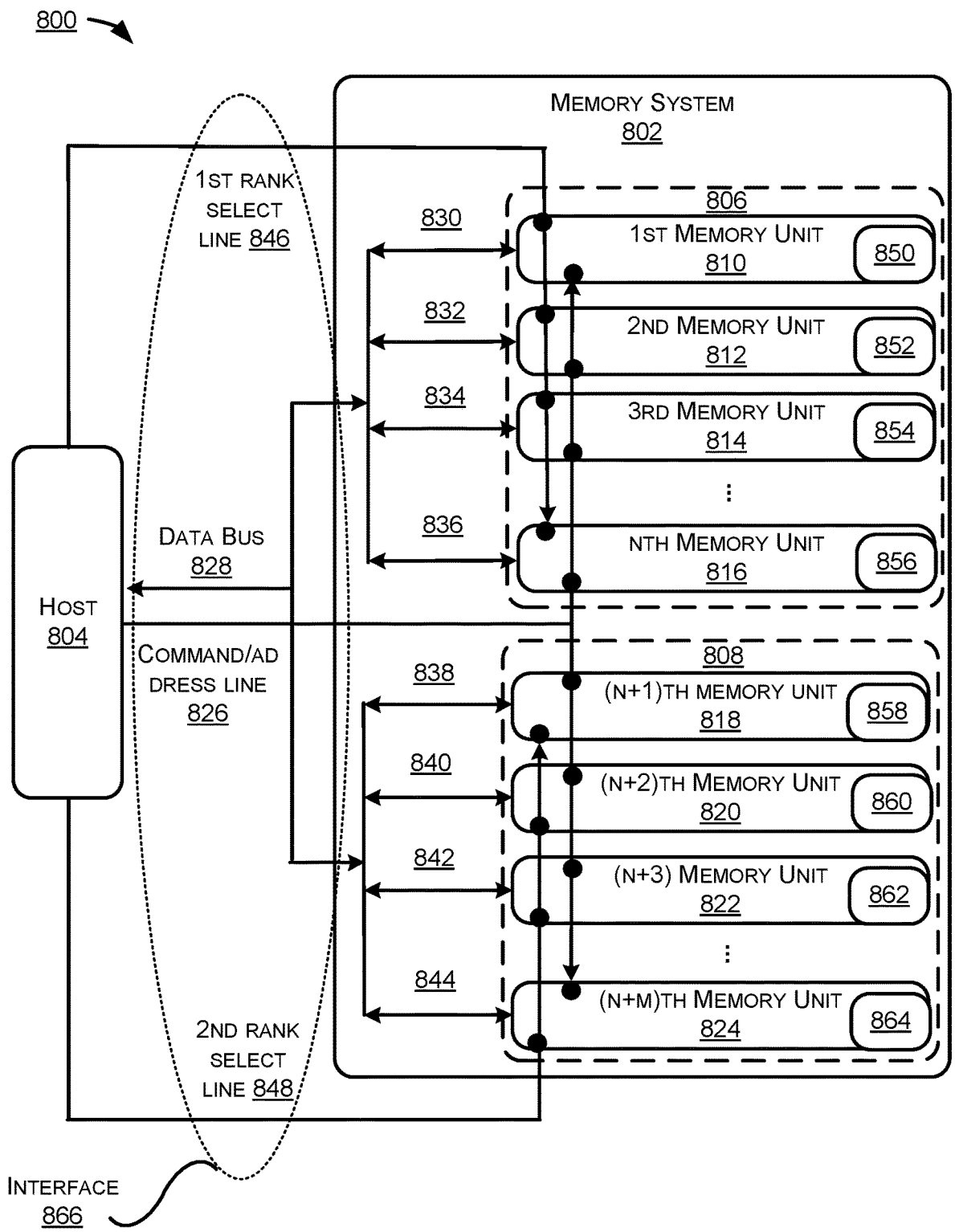
FIG. 8 illustrates an example schematic of communications between a memory system and a host.

FIG. 8 illustrates an example schematic 800 of communications between a memory system 802 and a host 804, where different types of signals, i.e., the rank select signals and the unit I/O enable register signals may be used in combination to form a hybrid control manner. In implementations, the memory system 802 may be any suitable type of memory architectures such as a DDR based multi-channel memory architecture and the like. In implementations, the memory system 802 may include volatile memory, such as RAM, DRAM, cache, and the like, and non-volatile, such as ROM, flash memory, miniature hard drive, and the like, or any combination thereof. In implementations, the host 804 may include, but is not limited to, a CPU, an ASIC, a GPU, FPGAs, a DSP, or any combination thereof.

Referring to FIG. 8, the memory system 802 may include a first group 806 of memory units and a second group 808 of memory units. The first group 806 may include n memory units, including a first memory unit 810, a second memory unit 812, a third memory unit 814, . . . , and an $n^{th}$ memory unit 816. The second group 808 may include m memory units, including an (n+1)th memory unit 818, an (n+2)th memory unit 820, . . . , and an (n+m)th memory unit 824. By way of example but not limitation, the number n and m are powers of 2. Though FIG. 8 shows two groups of memory units, the present disclosure is not limited thereto. The memory system 802 may include more than two groups of memory units.

In implementations, a respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824 may be configured with the accelerator architecture, for example, the PIM architecture and the like. The accelerator architecture and the PIM architecture are as described above and shall not be repeated herein.

The respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824 is configured to receive command/address signals via the command/address signal line 826 from the host 804.

The respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824 is further configured to transfer data/signals to/from the host 804 over a data bus 828.

In implementations, the data width of the data bus 814 may be any suitable width, for example, 64 bits and the like. In implementations, the data bus 814 may include bidirectional datapaths/channels for respective memory unit to communicate with the host 804 to transfer data/signals, and the datapaths/channels are referred to as unit interface_1 830, unit interface_2 832, unit interface_3 834, . . . , unit interface_n 836, unit interface (n+1) 838, unit interface (n+2) 840, unit interface (n+3) 842, . . . , unit interface (n+m) 844. The data width of the respective unit interface may be any suitable width, for example, 16 bits and the like.

In implementations, the unit interface_1 830 is configured to transfer data/signals between the first memory unit 810 and the host 804. The unit interface_2 812 is configured to transfer data/signals between the first memory unit 814 and the host 804. The unit interface_3 834 is configured to transfer data/signals between the first memory unit 814 and the host 804. The unit interface_n 836 is configured to transfer data/signals between the first memory unit 816 and the host 804. The unit interface (n+1) 838 is configured to transfer data/signals between the first memory unit 818 and the host 804. The unit interface (n+2) 840 is configured to transfer data/signals between the first memory unit 820 and the host 804. The unit interface (n+3) 842 is configured to transfer data/signals between the first memory unit 822 and the host 804. The unit interface (n+m) 844 is configured to transfer data/signals between the first memory unit 824 and the host 804.

In the first group 806, the respective memory unit of the first memory unit 810, the second memory unit 812, the third memory unit 814, . . . , and the $n^{th}$ memory unit 816 is further configured to receive a first rank select signal via a first rank select line 846 from the host 804. In implementations, the first group of memory units is selected/unselected together by the first rank select signal.

In the second group 808, the respective memory unit of the (n+1)th memory unit 818, the (n+2)th memory unit 820, . . . , and the (n+m)th memory unit 824 are further configured to receive a second rank select signal via a second rank select line 848 from the host 804. In implementations, the second group of memory units is selected/unselected together by the second rank select signal.

The respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824 may include a respective unit I/O enable register. For example, the first memory unit 810 includes a first unit I/O enable register 850. The second memory unit 812 includes a second unit I/O enable register 852. The third memory unit 814 includes a third unit I/O enable register 854. The $n^{th}$ memory unit 816 includes an $n^{th}$ unit I/O enable register 856. The (n+1)th memory unit 818 includes an (n+1)th unit I/O enable register 818. The (n+2)th memory unit 820 includes an (n+3)th unit I/O enable register 820. The (n+m)th memory unit 824 includes an (n+m)th unit I/O enable register 864.

The host 804 is configured to transfer data/signals to/from the respective memory unit via the data bus 828/respective unit interface 830, 832, 834, 836, 838, 840, 842, or 844. The functions of the data bus 828 and unit interfaces 830, 832, 834, 836, 838, 840, 842, and 844 are as described above and shall not be repeated herein.

The host 804 is further configured to send the command/address signals via the command/address line 826 to the respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824.

The host 804 is further configured to send the first rank select signal via the first rank select line 846 to the respective memory unit in the first group 806. The host 804 is further configured to send the second rank select signal via the second rank select line 848 to the respective memory unit in the second group 808. Thus, the n memory units in the first group 806 are selected together by the first rank select signal, and the m memory units in the second group 808 are selected together by the second rank select signal.

The host 804 is further configured to send unit I/O enable signals to the respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824 via the data bus 822/respective unit interface. The unit I/O enable signals are configured to individually select/unselect the respective memory unit by setting the respective unit I/O enable register.

For example, the host 804 is further configured to send a first unit I/O enable signal to the first memory unit 810 via the unit interface_1 830 to select/unselect the first memory unit 810 by setting the first unit I/O enable register 850. The host 804 is further configured to send a second unit I/O enable signal to the second memory unit 812 via the unit interface_2 832 to select/unselect the second memory unit 812 by setting the second unit I/O enable register 852. The host 804 is further configured to send a third unit I/O enable signal to the third memory unit 814 via the unit interface_3 834 to select/unselect the third memory unit 814 by setting the third unit I/O enable register 854. The host 804 is further configured to send an $n^{th}$ unit I/O enable signal to the $n^{th}$ memory unit 816 via the unit interface_n 836 to select/unselect the $n^{th}$ memory unit 816 by setting the $n^{th}$ unit I/O enable register 856.

For example, the host 804 is further configured to send an (n+1)th unit I/O enable signal to the (n+1)th memory unit 818 via the unit interface_(n+1) 838 to select/unselect the (n+1)th memory unit 818 by setting the (n+1)th unit I/O enable register 858. The host 804 is further configured to send an (n+2)th unit I/O enable signal to the (n+2)th memory unit 820 via the unit interface_(n+2) 840 to select/unselect the (n+2)th memory unit 820 by setting the (n+2)th unit I/O enable register 860. The host 804 is further configured to send an (n+3)th unit I/O enable signal to the (n+3)th memory unit 822 via the unit interface_3 842 to select/unselect the (n+3)th memory unit 822 by setting the (n+3)th unit I/O enable register 862. The host 804 is further configured to send an (n+m)th unit I/O enable signal to the (n+m)th memory unit 824 via the unit interface_(n+m) 836 to select/unselect the (n+m)th memory unit 824 by setting the (n+m)th unit I/O enable register 864.

The host 804 is further configured to individually access the respective memory unit of the first memory unit 810, the second memory unit 812, the third memory unit 814, . . . , and the $n^{th}$ memory unit 816, the (n+1)th memory unit 818, the (n+2)th memory unit 820, . . . , and the (n+m)th memory unit 824 via the data bus 828/respective unit interface to perform read and/or write operations. The functions of the data bus 828 and unit interfaces 830, 832, 834, 836, 838, 840, 842, and 844 are as described above and shall not be repeated herein.

Collectively, the data bus 828, the command/address line 826, the first rank select line 846, and the second rank select line 848 may be referred to as interface 866. In other words, the interface 866 may include the data bus 828, the command/address line 826, the first rank select line 846, and the second rank select line 848. The interface 866 is coupled between the host 804 and the memory system 802/the respective memory units. In implementations, the interface 866 may be any suitable memory interfaces, for example, a DDR interface. In implementations, the interface 866 may further include other lines such as clock lines, response signal lines, control signal lines, and the like.

As described above, in the conventional DDR interface based memory module, all memory chips/units within the same rank are always selected simultaneously and work in lockstep. However, different chips/units cannot be selected, controlled, or accessed (read/write) separately.

With the above example schematic 800, a group of memory units can be selected by the rank signal, and one or more memory units within the selected group can be further selected by the unit I/O enable signals. Therefore, the host 804 can select, control, and access (read/write) the respective memory unit in the memory system 802 individually with accuracy and flexibility even if the memory units are arranged in groups. Hence, the problem in the conventional DDR based memory that chips/units always work in lockstep can be overcome. Thus, the memory control is improved.

Figure 9:
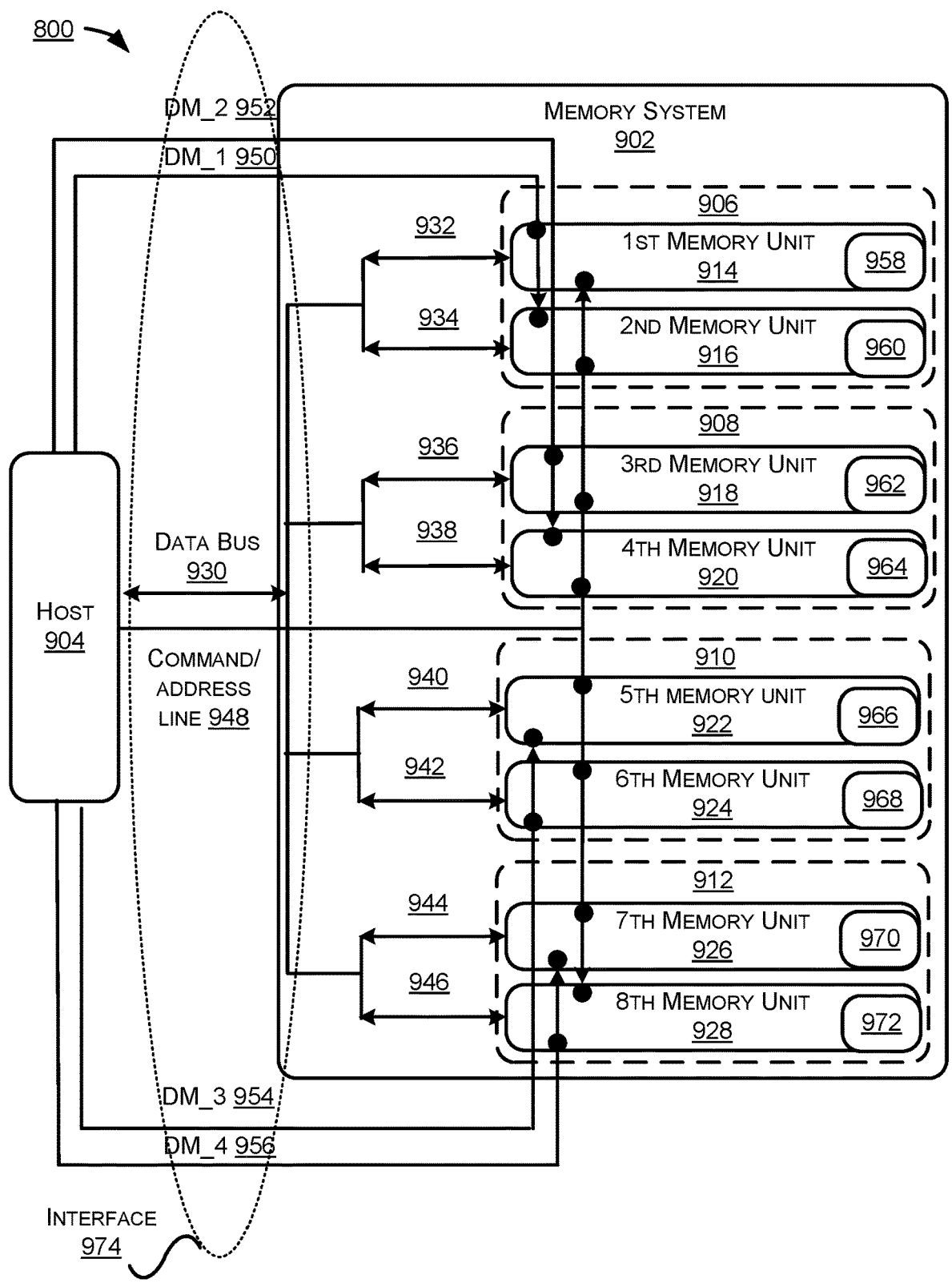
FIG. 9 illustrates an example schematic of communications between a memory system and a host.

FIG. 9 illustrates an example schematic 900 of communications between a memory system and a host, where different types of signals, i.e., the data mask signals and the unit I/O enable register signals may be used in combination to form a hybrid control manner. In implementations, the memory system 902 may be any suitable type of memory architectures such as a DDR based multi-channel memory architecture and the like. In implementations, the memory system 902 may include volatile memory, such as RAM, DRAM, cache, and the like, and non-volatile, such as ROM, flash memory, miniature hard drive, and the like, or any combination thereof. In implementations, the host 904 may include, but is not limited to, a CPU, an ASIC, a GPU, FPGAs, a DSP, or any combination thereof.

Referring to FIG. 9, the memory system 902 may include a first group 906 of memory units, a second group 908 of memory units, a third group 910 of memory units, and a fourth group 912 of memory units. Though FIG. 9 shows four groups of memory units, the present disclosure is not limited thereto. The memory system 902 may include other numbers of groups of memory units.

In implementations, the first group 906 may include a first memory unit 914 and a second memory unit 916. The second group 908 may include a third memory unit 918 and a fourth memory unit 920. The third group 910 may include a fifth memory unit 922 and a sixth memory unit 924. The fourth group 912 may include a seventh memory unit 926 and an eighth memory unit 928. Though FIG. 9 shows a respective group includes two memory units, the present disclosure is not limited thereto. The respective group may include more than two memory units.

In implementations, a respective memory unit of the first memory unit 914, the second memory unit 916, the third memory unit 918, the fourth memory unit 920, the fifth memory unit 922, the sixth memory unit 924, the seventh memory unit 926, and the eighth memory unit 928 may be configured with the accelerator architecture, for example, the PIM architecture and the like. The accelerator architecture and the PIM architecture are as described above and shall not be repeated herein.

The respective memory unit of the first memory unit 914, the second memory unit 916, the third memory unit 918, the fourth memory unit 920, the fifth memory unit 922, the sixth memory unit 924, the seventh memory unit 926, and the eighth memory unit 928 is configured to transfer data/signals to/from the host 904 over a data bus 930.

In implementations, the data width of the data bus 930 may be any suitable width, for example, 64 bits and the like. In implementations, the data bus 930 may include bidirectional datapaths/channels for respective memory unit to communicate with the host 904 to transfer data/signals, and the datapaths/channels are referred to as unit interface_1 932, unit interface_2 934, unit interface_3 936, . . . , unit interface_4 938, unit interface_5 940, unit interface_6 942, unit interface_7 944, and unit interface_8 946. The data width of the respective unit interface may be any suitable width, for example, 8 bits and the like.

In implementations, unit interface_1 932 is configured to transfer data/signals between the first memory unit 914 and the host 904. The unit interface_2 934 is configured to transfer data/signals between the second memory unit 916 and the host 904. The unit interface_3 936 is configured to transfer data/signals between the third memory unit 918 and the host 904. The unit interface_4 938 is configured to transfer data/signals between the fourth memory unit 920 and the host 904. The unit interface_5 940 is configured to transfer data/signals between the fifth memory unit 922 and the host 904. The unit interface_6 942 is configured to transfer data/signals between the sixth memory unit 926 and the host 904. The unit interface_7 944 is configured to transfer data/signals between the seventh memory unit 928 and the host 904. The unit interface_8 946 is configured to transfer data/signals between the eighth memory unit 930 and the host 904.

The respective memory unit of the first memory unit 914, the second memory unit 916, the third memory unit 918, the fourth memory unit 920, the fifth memory unit 922, the sixth memory unit 924, the seventh memory unit 926, and the eighth memory unit 928 is further configured to receive command/address signals via the command/address signal line 948 from the host 904.

In the first group 906, the respective memory unit of the first memory unit 914 and the second memory unit 916 is further configured to receive a first data mask signal via a data mask line DM_1 950.

In the second group 908, the respective memory unit of the third memory unit 918 and the fourth memory unit 920 is further configured to receive a second data mask signal via a data mask line DM_2 952.

In the third group 910, the respective memory unit of the fifth memory unit 922 and the sixth memory unit 924 is further configured to receive a third data mask signal via a data mask line DM_3 954.

In the fourth group 912, the respective memory unit of the seventh memory unit 926 and the eighth memory unit 928 is further configured to receive a fourth data mask signal via a data mask line DM_4 956.

The respective memory unit of the first memory unit 914, the second memory unit 916, the third memory unit 918, the fourth memory unit 920, the fifth memory unit 922, the sixth memory unit 924, the seventh memory unit 926, and the eighth memory unit 928 may include a respective unit I/O enable register. For example, the first memory unit 914 may include a first unit I/O enable register 958. The second memory unit 916 may include a second unit I/O enable register 960. The third memory unit 918 may include a third unit I/O enable register 962. The fourth memory unit 920 may include a fourth unit I/O enable register 964. The fifth memory unit 922 may include a fifth unit I/O enable register 966. The sixth memory unit 924 may include a sixth unit I/O enable register 968. The seventh memory unit 926 may include a seventh unit I/O enable register 970. The eighth memory unit 928 may include an eighth unit I/O enable register 972.

The host 904 is configured to transfer data/signals to/from the respective memory unit via the data bus 930/respective unit interface 932, 934, 936, 939, 940, 942, 944, or 946. The functions of the data bus 930 and unit interfaces 932, 934, 936, 939, 940, 942, 944, and 946 are as described above and shall not be repeated herein.

The host 904 is further configured to send the command/address signals via the command/address line 948 to the respective memory unit of the first memory unit 914, the second memory unit 916, the third memory unit 918, the fourth memory unit 920, the fifth memory unit 922, the sixth memory unit 924, the seventh memory unit 926, and the eighth memory unit 928.

In implementations, the host 904 may be designed/customized to send multiple data mask signals via multiple data mask lines.

For example, the host 904 is further configured to send the first data mask signal via the data mask line DM_1 950 to the first group 906 of memory units. Thus, the first memory unit 914 and the second memory unit 916 are selected together by the first data mask signal. In implementations, the first data mask signal is configured mask/unmask the data bits transferred over the unit interface_1 932 and the unit interface_2 934. When the data bits transferred over the unit interface_1 932 and the unit interface_2 934 are masked, the data bits transferred over the unit interface_1 932 and the unit interface_2 934 received by the first memory unit 914 and the second memory unit 916 will be ignored. In other words, the first memory unit 914 and the second memory unit 916 are unselected. When the data bits transferred over the unit interface_1 932 and the unit interface_2 934 are unmasked, the data bits transferred over the unit interface_1 932 and the unit interface_2 934 can be received by the first memory unit 914 and the second memory unit 916. In other words, the first memory unit 914 and the second memory unit 916 are selected.

For example, the host 904 is further configured to send the second data mask signal via the data mask line DM_2 952 to the second group 908 of memory units. Thus, the third memory unit 918 and the fourth memory unit 920 are selected together by the second data mask signal. In implementations, the second data mask signal is configured mask/unmask the data bits transferred over the unit interface_3 936 and the unit interface_4 938. When the data bits transferred over the unit interface_3 936 and the unit interface_4 938 are masked, the data bits transferred over the unit interface_3 936 and the unit interface_4 938 received by the third memory unit 918 and the fourth memory unit 920 will be ignored. In other words, the third memory unit 918 and the fourth memory unit 920 are unselected. When the data bits transferred over the unit interface_3 936 and the unit interface_4 938 are unmasked, the data bits transferred over the unit interface_3 936 and the unit interface_4 938 can be received by the third memory unit 918 and the fourth memory unit 920. In other words, the third memory unit 918 and the fourth memory unit 920 are selected.

For example, the host 904 is further configured to send the third data mask signal via the data mask line DM_3 954 to the third group 910 of memory units. Thus, the fifth memory unit 922 and the sixth memory unit 924 are selected together by the third data mask signal. In implementations, the third data mask signal is configured mask/unmask the data bits transferred over the unit interface_5 940 and the unit interface_6 942. When the data bits transferred over the unit interface_5 940 and the unit interface_6 942 are masked, the data bits transferred over the unit interface_5 940 and the unit interface_6 942 received by the fifth memory unit 922 and the sixth memory unit 924 will be ignored. In other words, the fifth memory unit 922 and the sixth memory unit 924 are unselected. When the data bits transferred over the unit interface_5 940 and the unit interface_6 942 are unmasked, the data bits transferred over the unit interface_5 940 and the unit interface_6 942 can be received by the fifth memory unit 922 and the sixth memory unit 924. In other words, the fifth memory unit 922 and the sixth memory unit 924 are selected.

For example, the host 904 is further configured to send the fourth data mask signal via the data mask line DM_4 956 to the fourth group 912 of memory units. Thus, the seventh memory unit 926 and the eighth memory unit 928 are selected together by the fourth data mask signal. In implementations, the fourth data mask signal is configured mask/unmask the data bits transferred over the unit interface_7 944 and the unit interface_8 946. When the data bits transferred over the unit interface_7 944 and the unit interface_8 946 are masked, the data bits transferred over the unit interface_7 944 and the unit interface_8 946 received by the seventh memory unit 926 and the eighth memory unit 928 will be ignored. In other words, the seventh memory unit 926 and the eighth memory unit 928 are unselected. When the data bits transferred over the unit interface_7 944 and the unit interface_8 946 are unmasked, the data bits transferred over the unit interface_7 944 and the unit interface_8 946 can be received by the seventh memory unit 926 and the eighth memory unit 928. In other words, the seventh memory unit 926 and the eighth memory unit 928 are selected.

For example, the host 904 is further configured to send unit I/O enable signals to the respective memory unit via the data bus 930/respective unit interface to individually select/unselect the respective memory unit by setting the respective unit I/O enable register.

For example, the host 904 is further configured to send a first unit I/O enable signal to the first memory unit 914 via the unit interface_1 932 to select/unselect the first memory unit 914 by setting the first unit I/O enable register 958. The host 904 is further configured to send a second unit I/O enable signal to the second memory unit 916 via the unit interface_2 934 to select/unselect the second memory unit 916 by setting the second unit I/O enable register 960. The host 904 is further configured to send a third unit I/O enable signal to the third memory unit 918 via the unit interface_3 936 to select/unselect the third memory unit 918 by setting the third unit I/O enable register 962. The host 904 is further configured to send a fourth unit I/O enable signal to the fourth memory unit 920 via the unit interface_4 938 to select/unselect the fourth memory unit 920 by setting the fourth unit I/O enable register 964. The host 904 is further configured to send a fifth unit I/O enable signal to the fifth memory unit 922 via the unit interface_5 940 to select/unselect the fifth memory unit 922 by setting the fifth unit I/O enable register 966. The host 904 is further configured to send a sixth unit I/O enable signal to the sixth memory unit 924 via the unit interface_6 942 to select/unselect the sixth memory unit 924 by setting the sixth unit I/O enable register 968. The host 904 is further configured to send a seventh unit I/O enable signal to the seventh memory unit 926 via the unit interface_7 944 to select/unselect the seventh memory unit 926 by setting the seventh unit I/O enable register 970. The host 904 is further configured to send an eighth unit I/O enable signal to the eighth memory unit 928 via the unit interface_8 946 to select/unselect the eighth memory unit 928 by setting the eighth unit I/O enable register 972.

The host 904 is further configured to individually access the respective memory unit of the first memory unit 914, the second memory unit 916, the third memory unit 918, the fourth memory unit 920, the fifth memory unit 922, the sixth memory unit 924, the seventh memory unit 926, and the eighth memory unit 928 via the data bus 930/respective unit interface to perform read and/or write operations. The functions of the data bus 930 and unit interfaces 932, 934, 936, 939, 940, 942, 944, and 946 are as described above and shall not be repeated herein.

Collectively, the data bus 930, the command/address line 948, and data mask lines DM_1 950, DM_2 952, DM_3 954, and DM_4 956 may be referred to as interface 974. In other words, the interface 974 may include the data bus 930, the command/address line 948, and data mask lines DM_1 950, DM_2 952, DM_3 954, and DM_4 956. The interface 974 is coupled between the host 904 and the memory system 902/the respective memory units. In implementations, the interface 974 may be any suitable memory interfaces, for example, a DDR interface. In implementations, the interface 974 may further include other lines such as clock lines, response signal lines, control signal lines, and the like.

As described above, a conventional DDR interface based memory module is designed with two or more ranks, and only one rank can be selected at a given time. Therefore, all memory chips/units within the same rank are always selected simultaneously and work in lockstep. However, different chips/units within the same rank cannot be selected separately.

With the above example schematic 900, one or more groups of memory units can be selected by the data mask signals, and one or more memory units within the selected group can be further selected by the unit I/O enable signals. Therefore, the host 904 can select, control, and access (read/write) the respective memory unit in the memory system 902 individually with accuracy and flexibility even if the memory units are arranged in groups. Hence, the problem in the conventional DDR based memory that chips/units always work in lockstep can be overcome. Thus, the memory control is improved.

As described above with reference to FIG. 7, FIG. 8, and FIG. 9 different types of signals may be used in combination to control the memory system to achieve more complex control to adapt to different usage scenarios. However, the arrangements shown in FIG. 7, FIG. 8, and FIG. 9 are for the purpose of description rather than limitation. Other elements may be added, and other types of signals may be used in combination with rank select signals, the data mask signals, and the unit I/O enable register signals. Other ways of combinations may be derived based on the teaching of the present disclosure.

Figure 10:
FIG. 10 illustrates an example process for memory control.

FIG. 10 illustrates an example process 1000 for memory control.

Referring to FIG. 10, at block 1002, a host individually selects one or more memory units of a plurality of memory units of a memory system by sending one or more signals to the memory system. In implementations, the respective memory unit of the plurality of memory units is configured with an accelerator architecture, for example, a PIM architecture. Examples of the accelerator architecture are as described above and shall not be repeated herein.

In implementations, the host may be configured to send one or more signals, including one or more rank select signals. In implementations, a respective memory unit of the plurality of memory units is selected by a respective rank select signal of the one or more rank select signals at a time. Details of the one or more rank select signals are as described above and shall not be repeated herein.

In implementations, the host may be configured to send one or more signals, including one or more data mask signals. In implementations, the one or more data mask signals are sent by the host during a write operation. In implementations, the host may be configured to send one or more data mask signals to the more or more memory units. Details of the one or more data mask signals are as described above and shall not be repeated herein.

In implementations, the host may be configured to send one or more signals, including one or more unit I/O enable signals. In implementations, a respective memory unit of the plurality of memory units includes a respective unit I/O enable register. In implementations, the respective unit I/O enable register is configured to enable/disable an I/O function of the respective memory unit. Details of the one or more unit I/O enable signals are as described above and shall not be repeated herein.

At block 1004, the host accesses the one or more memory unit.

As described above, in the conventional DDR interface based memory module, all memory chips/units within the same rank are always selected simultaneously and work in lockstep. However, different chips/units cannot be selected, controlled, or accessed (read/write) separately.

With the above example process 1000, the respective memory unit can be selected, controlled, and accessed (read/write) individually by the host using the one or more signals. Hence, the problem in the conventional DDR based memory that chips/units always work in lockstep can be overcome. Thus, the memory control is improved.

The example process 1000 is for the purpose of description, and the present disclosure is not limited thereto. Blocks in example process 1000 may be omitted, combined, or performed once, twice, or multiple times. Moreover, additional bocks may be added into the example process 1000.

Figure 11:
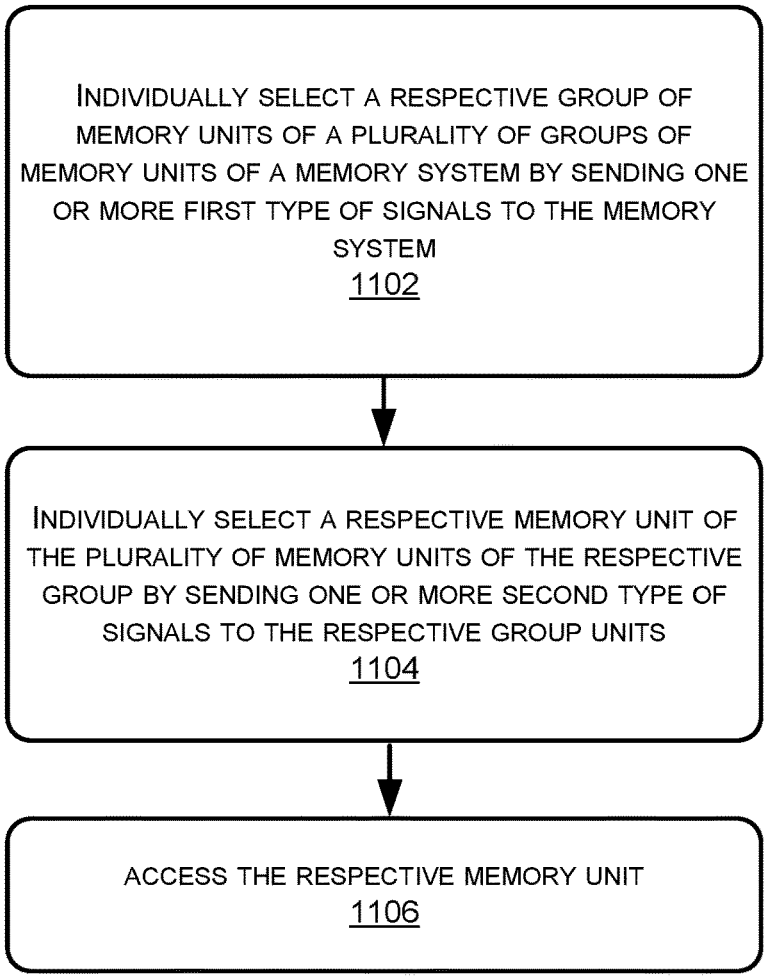
FIG. 11 illustrates an example process for memory control.

FIG. 11 illustrates an example process 1100 for memory control.

Referring to FIG. 11, at block 1102, a host selects a respective group of memory units of a plurality of groups of memory units of a memory system by sending one or more first type of signals to the memory system. A respective group of the plurality of groups includes a plurality of memory units. In implementations, a respective memory unit of the plurality of memory units is configured with an accelerator architecture, for example, a PIM architecture and the like. Examples of the accelerator architecture are as described above and shall not be repeated herein.

In implementations, the host may be configured to send one or more rank select signals as the one or more first type of signals. In implementations, the host may be configured to send one or more data mask signals as the one or more first type of signals. Details of the rank select signal and the data mask signal are as described above and shall not be repeated herein.

At block 1104, the host individually selects a respective memory unit of the plurality of memory units of the respective group by sending one or more second type of signals to the respective group units.

In implementations, the host may be configured to send one or more data mask signals as the one or more second type of signals. In implementations, the host may be configured to send one or more unit I/O enable signals as the one or more second type of signals. Details of the data mask signals and the unit I/O enable signals are as described above and shall not be repeated herein.

At block 1106, the host accesses the respective memory unit.

As described above, the conventional DDR interface based memory module is designed with two or more ranks, and only one rank can be selected at a given time. Therefore, all memory chips/units within the same rank are always selected simultaneously and work in lockstep. However, different chips/units within the same rank cannot be selected, controlled, or accessed (read/write) separately.

With the above example process 1100, different types of signals may be used in combination to control the memory system to achieve more complex control to adapt to different usage scenarios. For example, the rank select signals and the data mask signals may be used in combination to form a hybrid control manner. A group of memory units is selected by the host with the rank signal, and respective memory units within the selected group can be individually selected by the host with the unit I/O enable signals. For another example, the rank select signals and the unit I/O enable register signals may be used in combination to form another hybrid control manner. A group of memory units can be selected by the host with the rank signal, and respective memory units within the selected group can be individually selected by the host with the unit I/O enable signals. For another example, the data mask signals and the unit I/O enable register signals may be used in combination to form yet another hybrid control manner. A group of memory units can be selected by the host with the data mask signal, and respective memory units within the selected group can be individually selected by the host with the unit I/O enable signals. More details are as described above with reference to FIG. 7, FIG. 8, and FIG. 9. Therefore, the host can individually select, control, and access (read/write) the respective memory unit in the memory system with accuracy and flexibility, even if the memory units are arranged in groups. Hence, the problem in the conventional DDR based memory that chips/units always work in lockstep can be overcome. Thus, the memory control is improved.

The example process 1100 is for the purpose of description, and the present disclosure is not limited thereto. Blocks in example process 1100 may be omitted, combined, or performed once, twice, or multiple times. Moreover, additional bocks may be added into the example process 1100.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RANI), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to the drawings. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

Clause 1. 1. A memory architecture, coupled with a host external to the memory architecture, the memory architecture comprising: a plurality of memory units, a respective memory unit of the plurality of memory units being configured with a Processing-In-Memory (PIM) architecture; and an interface, coupled between the plurality of memory units and the host, the interface including a plurality of lines, the interface being configured to receive one or more signals from the host via the plurality of lines; wherein the respective memory unit of the plurality of memory units is coupled with a respective line of the plurality of lines, and the respective memory unit is further configured to receive a respective signal of the one or more signals via the interface so as to be individually selected by the host.

Clause 2. The memory architecture of clause 1, wherein the interface is further configured to receive the one or more signals including one or more rank select signals.

Clause 3. The memory architecture of clause 2, wherein the respective memory unit of the plurality of memory units is further configured to receive a respective rank select signal of the one or more rank select signals via the respective line of the plurality of lines of the interface.

Clause 4. The memory architecture of clause 1, wherein the interface is further configured to receive the one or more signals including one or more data mask signals.

Clause 5. The memory architecture of clause 4, wherein the respective memory unit of the plurality of memory units is further configured to receive a respective data mask signal of the one or more data mask signals via the respective line of the plurality of lines of the interface.

Clause 6. The memory architecture of clause 1, wherein the interface is further configured to receive the one or more signals including one or more unit Input/Output (I/O) enable signals.

Clause 7. The memory architecture of clause 6, wherein the respective memory unit of the plurality of memory units includes a respective unit I/O enable register, the respective unit I/O enable register being configured to enable/disable an I/O function of the respective memory unit.

Clause 8. The memory architecture of clause 6, wherein the respective memory unit of the plurality of memory units is further configured to receive a respective unit I/O enable signal via the interface.

Clause 9. The memory architecture of clause 1, wherein the PIM architecture includes: a data area, configured to store data; and a computation block, configure to perform computation.

Clause 10. A method comprising: individually selecting one or more memory units of a plurality of memory units of a memory system by sending one or more signals to the memory system, wherein the respective memory unit of the plurality of memory units is configured with a Processing-In-Memory (PIM) architecture; and accessing the one or more memory unit.

Clause 11. The method of clause 10, wherein sending the one or more signals includes sending one or more rank select signals.

Clause 12. The method of clause 11, wherein individually selecting the respective memory unit includes individually selecting the respective memory unit with a respective rank select signal of the one or more rank select signals.

Clause 13. The method of clause 10, wherein sending the one or more signals includes sending one or more data mask signals.

Clause 14. The method of clause 13, wherein individually selecting the respective memory unit includes individually selecting the respective memory unit with a respective data mask signal of the one or more data mask signals.

Clause 15. The method of clause 10, wherein sending the one or more signals includes sending one or more unit I/O enable signals.

Clause 16. The method of clause 15, wherein the respective memory unit of the plurality of memory units includes a respective unit I/O enable register, the respective unit I/O enable register being configured to enable/disable an I/O function of the respective memory unit.

Clause 17. The method of clause 15, wherein individually selecting the respective memory unit includes individually selecting the respective memory unit with a respective unit I/O enable signal of the one or more unit I/O enable signals.

Clause 18. A system, comprising: a memory architecture, coupled with a host external to the memory architecture, the memory architecture including a plurality of memory units, a respective memory unit of the plurality of memory units being configured with a Processing-In-Memory (PIM) architecture; and an interface, coupled between the plurality of memory units and the host, the interface including a plurality of lines, the interface being configured to receive one or more signals from the host via the plurality of lines; wherein the respective memory unit of the plurality of memory units is coupled with a respective line of the plurality of lines, and the respective memory unit of the plurality of memory units is further configured to receive a respective signal of the one or more signals via the interface so as to be individually selected by the host; the host, configured to send the one or more signals to the memory architecture via the interface and access the respective memory unit.

Clause 19. The system of clause 18, wherein the interface is further configured to receive the one or more signals including one or more rank select signals.

Clause 20. The system of clause 19, wherein the respective memory unit of the plurality of memory units is further configured to receive a respective rank select signal of the one or more rank select signals via the respective line of the plurality of lines of the interface.

Clause 21. The system of clause 18, wherein the interface is further configured to receive the one or more signals including one or more data mask signals.

Clause 22. The system of clause 21, wherein the respective memory unit of the plurality of memory units is further configured to receive a respective data mask signal of the one or more data mask signals via the respective line of the plurality of lines of the interface.

Clause 23. The system of clause 18, wherein the interface is further configured to receive the one or more signals including one or more unit Input/Output (I/O) enable signals.

Clause 24. The system of clause 23, wherein the respective memory unit of the plurality of memory units includes a respective unit I/O enable register, the respective unit I/O enable register being configured to enable/disable an I/O function of the respective memory unit.

Clause 25. The system of clause 23, wherein the respective memory unit of the plurality of memory units is further configured to receive a respective unit I/O enable signal via the interface.

Clause 26. The system of clause 18, wherein the PIM architecture includes: a data area, configured to store data; and a computation block, configure to perform computation.

Clause 27. A memory architecture, coupled with a host external to the memory architecture, the memory architecture comprising: a plurality of groups of memory units, a respective group including a plurality of memory units, and a respective memory unit of the plurality of memory units being configured with a Processing-In-Memory (MI) architecture; and an interface, coupled between the memory architecture and the host, the interface including a plurality of lines, the interface being configured to receive one or more first type of signals and one or more second type of signals from the host via the plurality of lines; wherein the respective group of the plurality of groups is configured to be selected by the host with a respective first type of signal of the one or more first type of signal; wherein the respective memory unit of the plurality of memory units is coupled with a respective line of the plurality of lines, and the respective memory unit of the plurality of memory units is further configured to receive a respective second type of signal of the one or more second type of signals via the interface so as to be individually selected by the host.

Clause 28. The memory architecture of clause 27, wherein the interface is further configured to receive the one or more first type of signals including one or more rank select signals.

Clause 29. The memory architecture of clause 28, wherein the interface is further configured to receive the one or more second type of signals including one or more data mask signals.

Clause 30. The memory architecture of clause 29, wherein the respective memory unit of the plurality of memory units is further configured to receive a respective data mask signal of the one or more data mask signals via the respective line of the plurality of lines of the interface.

Clause 31. The memory architecture of clause 28, wherein the interface is further configured to receive the one or more second type of signals including one or more unit Input/Output (I/O) enable signals.

Clause 32. The memory architecture of clause 31, wherein the respective memory unit of the plurality of memory units is further configured to receive a respective unit I/O enable signal of the one or more unit I/O enable signals via the interface.

Clause 33. The memory architecture of clause 32, wherein the respective memory unit of the plurality of memory units includes a respective unit I/O enable register, the respective unit I/O enable register being configured to enable/disable an I/O function of the respective memory unit.

Clause 34. The memory architecture of clause 27, wherein the interface is further configured to receive the one or more first type of signals including one or more data mask signals.

Clause 35. A system, comprising: a memory architecture, coupled with a host external to the memory architecture, the memory architecture comprising: a plurality of groups of memory units, a respective group including a plurality of memory units, and a respective memory unit of the plurality of memory units being configured with a Processing-In-Memory (PIM) architecture; and an interface, coupled between the memory architecture and the host, the interface including a plurality of lines, the interface being configured to receive one or more first type of signals and one or more second type of signals from the host via the plurality of lines; wherein the respective group of the plurality of groups is configured to be selected by the host with a respective first type of signal of the one or more first type of signal; wherein the respective memory unit of the plurality of memory units is coupled with a respective line of the plurality of lines, and the respective memory unit of the plurality of memory units is further configured to receive a respective second type of signal of the one or more second type of signals via the interface so as to be individually selected by the host; the host, configured to send the one or more signals to the memory architecture via the interface and access the respective memory unit.

Clause 36. The system of clause 35, wherein the interface is further configured to receive the one or more first type of signals including one or more rank select signals.

Clause 37. The system of clause 36, wherein the interface is further configured to receive the one or more second type of signals including one or more data mask signals.

Clause 38. The system of clause 37, wherein the respective memory unit of the plurality of memory units is further configured to receive a respective data mask signal of the one or more data mask signals via the respective line of the plurality of lines of the interface.

Clause 39. The system of clause 37, wherein the interface is further configured to receive the one or more second type of signals including one or more unit Input/Output (I/O) enable signals.

Clause 40. The system of clause 39, wherein the respective memory unit of the plurality of memory units is further configured to receive a respective unit I/O enable signal of the one or more unit I/O enable signals via the interface.

Clause 41. The system of clause 40, wherein the respective memory unit of the plurality of memory units includes a respective unit I/O enable register, the respective unit I/O enable register being configured to enable/disable an I/O function of the respective memory unit.

Clause 42. The system of clause 35, wherein the interface is further configured to receive the one or more first type of signals including one or more data mask signals.

Clause 43. A method comprising: individually selecting a respective group of memory units of a plurality of groups of memory units of a memory system by sending one or more first type of signals to the memory system, the respective group of the plurality of groups including a plurality of memory units; individually selecting a respective memory unit of the plurality of memory units of the respective group by sending one or more second type of signals to the respective group, wherein the respective memory unit of the plurality of memory units is configured with a Processing-In-Memory (PIM) architecture; and accessing the respective memory unit.

Clause 44. The method of clause 43, wherein sending the first type of signal includes sending a rank select signal.

Clause 45. The method of clause 43, wherein sending the first type of signal includes sending a data mask signal.

Clause 46. The method of clause 43, wherein sending the one or more second type of signals includes sending one or more data mask signals.

Clause 47. The method of clause 43, wherein sending the one or more second type of signals includes sending one or more unit I/O enable signals.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A memory architecture, coupled with a host external to the memory architecture, the memory architecture comprising:
  a plurality of memory units, a respective memory unit of the plurality of memory units being configured with a Processing-In-Memory (PIM) architecture; and
  an interface, coupled between the plurality of memory units and the host, the interface including a plurality of lines, the interface being configured to receive one or more signals from the host via the plurality of lines;
  wherein the respective memory unit of the plurality of memory units is coupled with a respective line of the plurality of lines, and the respective memory unit is further configured to receive a respective signal of the one or more signals via the respective line of the plurality of lines of the interface so as to be separately selected by the host.

2. The memory architecture of claim 1, wherein the interface is further configured to receive the one or more signals including one or more rank select signals.

3. The memory architecture of claim 2, wherein the respective memory unit of the plurality of memory units is further configured to receive a respective rank select signal of the one or more rank select signals via the respective line of the plurality of lines of the interface.

4. The memory architecture of claim 1, wherein the interface is further configured to receive the one or more signals including one or more data mask signals.

5. The memory architecture of claim 4, wherein the respective memory unit of the plurality of memory units is further configured to receive a respective data mask signal of the one or more data mask signals via the respective line of the plurality of lines of the interface.

6. The memory architecture of claim 1, wherein the interface is further configured to receive the one or more signals including one or more unit Input/Output (I/O) enable signals.

7. The memory architecture of claim 6, wherein the respective memory unit of the plurality of memory units includes a respective unit I/O enable register, the respective unit I/O enable register being configured to enable/disable an I/O function of the respective memory unit.

8. The memory architecture of claim 6, wherein the respective memory unit of the plurality of memory units is further configured to receive a respective unit I/O enable signal via the interface.

9. The memory architecture of claim 1, wherein the PIM architecture includes:
  a data area, configured to store data; and
  a computation block, configure to perform computation.

10. A method comprising:
separately selecting one or more memory units of a plurality of memory units of a memory system by sending one or more signals via a plurality of lines to the memory system, wherein the respective memory unit of the plurality of memory units is configured with a Processing-In-Memory (PIM) architecture, wherein the respective memory unit of the plurality of memory units is coupled with a respective line of the plurality of lines, and the respective memory unit is further configured to receive a respective signal of the one or more signals via the respective line of the plurality of lines so as to be separately selected by the host; and
accessing the one or more memory unit.

11. The method of claim 10, wherein sending the one or more signals includes sending one or more rank select signals.

12. The method of claim 11, wherein individually selecting the respective memory unit includes individually selecting the respective memory unit with a respective rank select signal of the one or more rank select signals.

13. The method of claim 10, wherein sending the one or more signals includes sending one or more data mask signals.

14. The method of claim 13, wherein individually selecting the respective memory unit includes individually selecting the respective memory unit with a respective data mask signal of the one or more data mask signals.

15. The method of claim 10, wherein sending the one or more signals includes sending one or more unit I/O enable signals.

16. The method of claim 15, wherein the respective memory unit of the plurality of memory units includes a respective unit I/O enable register, the respective unit I/O enable register being configured to enable/disable an I/O function of the respective memory unit.

17. The method of claim 15, wherein individually selecting the respective memory unit includes individually selecting the respective memory unit with a respective unit I/O enable signal of the one or more unit I/O enable signals.

18. A system, comprising:
a memory architecture, coupled with a host external to the memory architecture, the memory architecture including
a plurality of memory units, a respective memory unit of the plurality of memory units being configured with a Processing-In-Memory (PIM) architecture; and
an interface, coupled between the plurality of memory units and the host, the interface including a plurality of lines, the interface being configured to receive one or more signals from the host via the plurality of lines;
wherein the respective memory unit of the plurality of memory units is coupled with a respective line of the plurality of lines, and the respective memory unit of the plurality of memory units is further configured to receive a respective signal of the one or more signals via the respective line of the plurality of lines of the interface so as to be separately selected by the host;
the host, configured to send the one or more signals to the memory architecture via the interface and access the respective memory unit.

19. The system of claim 18, wherein the interface is further configured to receive the one or more signals including one or more rank select signals.

20. The system of claim 19, wherein the respective memory unit of the plurality of memory units is further configured to receive a respective rank select signal of the one or more rank select signals via the respective line of the plurality of lines of the interface.

21. The system of claim 18, wherein the interface is further configured to receive the one or more signals including one or more data mask signals.

22. The system of claim 21, wherein the respective memory unit of the plurality of memory units is further configured to receive a respective data mask signal of the one or more data mask signals via the respective line of the plurality of lines of the interface.

23. The system of claim 18, wherein the interface is further configured to receive the one or more signals including one or more unit Input/Output (I/O) enable signals.

24. The system of claim 23, wherein the respective memory unit of the plurality of memory units includes a respective unit I/O enable register, the respective unit I/O enable register being configured to enable/disable an I/O function of the respective memory unit.

25. The system of claim 23, wherein the respective memory unit of the plurality of memory units is further configured to receive a respective unit I/O enable signal via the interface.

26. The system of claim 18, wherein the PIM architecture includes:
a data area, configured to store data; and
a computation block, configure to perform computation.

27. A memory architecture, coupled with a host external to the memory architecture, the memory architecture comprising:
a plurality of groups of memory units, a respective group including a plurality of memory units, and a respective memory unit of the plurality of memory units being configured with a Processing-In-Memory (PIM) architecture; and
an interface, coupled between the memory architecture and the host, the interface including a plurality of lines, the interface being configured to receive one or more first type of signals and one or more second type of signals from the host via the plurality of lines;
wherein the respective group of the plurality of groups is configured to be selected by the host with a respective first type of signal of the one or more first type of signal;
wherein the respective memory unit of the plurality of memory units is coupled with a respective line of the plurality of lines, and the respective memory unit of the plurality of memory units is further configured to receive a respective second type of signal of the one or more second type of signals via the respective line of the plurality of lines of the interface so as to be separately selected by the host.

28. The memory architecture of claim 27, wherein the interface is further configured to receive the one or more first type of signals including one or more rank select signals.

29. The memory architecture of claim 28, wherein the interface is further configured to receive the one or more second type of signals including one or more data mask signals.

30. The memory architecture of claim 29, wherein the respective memory unit of the plurality of memory units is further configured to receive a respective data mask signal of the one or more data mask signals via the respective line of the plurality of lines of the interface.

31. The memory architecture of claim 28, wherein the interface is further configured to receive the one or more second type of signals including one or more unit Input/Output (I/O) enable signals.

32. The memory architecture of claim 31, wherein the respective memory unit of the plurality of memory units is further configured to receive a respective unit I/O enable signal of the one or more unit I/O enable signals via the interface.

33. The memory architecture of claim 32, wherein the respective memory unit of the plurality of memory units includes a respective unit I/O enable register, the respective unit I/O enable register being configured to enable/disable an I/O function of the respective memory unit.

34. The memory architecture of claim 27, wherein the interface is further configured to receive the one or more first type of signals including one or more data mask signals.

35. A system, comprising:
a memory architecture, coupled with a host external to the memory architecture, the memory architecture comprising:
a plurality of groups of memory units, a respective group including a plurality of memory units, and a respective memory unit of the plurality of memory units being configured with a Processing-In-Memory (PIM) architecture; and
an interface, coupled between the memory architecture and the host, the interface including a plurality of lines, the interface being configured to receive one or more first type of signals and one or more second type of signals from the host via the plurality of lines;
wherein the respective group of the plurality of groups is configured to be selected by the host with a respective first type of signal of the one or more first type of signal;
wherein the respective memory unit of the plurality of memory units is coupled with a respective line of the plurality of lines, and the respective memory unit of the plurality of memory units is further configured to receive a respective second type of signal of the one or more second type of signals via the respective line of the plurality of lines of the interface so as to be separately selected by the host;
the host, configured to send the one or more signals to the memory architecture via the interface and access the respective memory unit.

36. The system of claim 35, wherein the interface is further configured to receive the one or more first type of signals including one or more rank select signals.

37. The system of claim 36, wherein the interface is further configured to receive the one or more second type of signals including one or more data mask signals.

38. The system of claim 37, wherein the respective memory unit of the plurality of memory units is further configured to receive a respective data mask signal of the one or more data mask signals via the respective line of the plurality of lines of the interface.

39. The system of claim 37, wherein the interface is further configured to receive the one or more second type of signals including one or more unit Input/Output (I/O) enable signals.

40. The system of claim 39, wherein the respective memory unit of the plurality of memory units is further configured to receive a respective unit I/O enable signal of the one or more unit I/O enable signals via the interface.

41. The system of claim 40, wherein the respective memory unit of the plurality of memory units includes a respective unit I/O enable register, the respective unit I/O enable register being configured to enable/disable an I/O function of the respective memory unit.

42. The system of claim 35, wherein the interface is further configured to receive the one or more first type of signals including one or more data mask signals.

43. A method comprising:
individually selecting a respective group of memory units of a plurality of groups of memory units of a memory system by sending one or more first type of signals to the memory system, the respective group of the plurality of groups including a plurality of memory units;
separately selecting a respective memory unit of the plurality of memory units of the respective group by sending one or more second type of signals via a plurality of lines to the respective group, wherein the respective memory unit of the plurality of memory units is configured with a Processing-In-Memory (PIM) architecture, wherein the respective memory unit of the plurality of memory units is coupled with a respective line of the plurality of lines, and the respective memory unit is further configured to receive a respective second type of signal of the one or more second type of signals via the respective line of the plurality of lines so as to be separately selected by the host; and
accessing the respective memory unit.

44. The method of claim 43, wherein sending the first type of signal includes sending a rank select signal.

45. The method of claim 43, wherein sending the first type of signal includes sending a data mask signal.

46. The method of claim 43, wherein sending the one or more second type of signals includes sending one or more data mask signals.

47. The method of claim 43, wherein sending the one or more second type of signals includes sending one or more unit I/O enable signals.

* * * * *